(12) United States Patent
Nelson

(10) Patent No.: US 9,458,872 B2
(45) Date of Patent: Oct. 4, 2016

(54) CONNECTOR DEVICES

(71) Applicant: Play from Scratch, LLC, St. Paul, MN (US)

(72) Inventor: Jeffrey Freeland Nelson, St. Paul, MN (US)

(73) Assignee: Play from Scratch LLC, St. Paul, MN (US)

( * ) Notice: Subject to any disclaimer, the term of this patent is extended or adjusted under 35 U.S.C. 154(b) by 0 days.

(21) Appl. No.: 14/213,123

(22) Filed: Mar. 14, 2014

(65) Prior Publication Data

US 2014/0270915 A1 Sep. 18, 2014

Related U.S. Application Data

(60) Provisional application No. 61/789,347, filed on Mar. 15, 2013, provisional application No. 61/865,445, filed on Aug. 13, 2013.

(51) Int. Cl.
*F16B 7/04* (2006.01)
*F16D 1/00* (2006.01)
*F16D 3/00* (2006.01)
(Continued)

(52) U.S. Cl.
CPC ............ *F16B 7/0446* (2013.01); *A63H 33/084* (2013.01); *F16B 7/00* (2013.01); *Y10T 403/341* (2015.01); *Y10T 403/55* (2015.01)

(58) Field of Classification Search
CPC ............ Y10T 403/55; Y10T 403/341; A63H 33/084; F16B 7/00; F16B 7/0446
USPC ....... 403/173, 250, 251, 252, 292, 293, 294, 403/345, 170; 24/67 R, 67.9, 130, 129 B, 24/563; 248/309.1, 37.3, 37.6, 346.01, 248/346.03; 446/124, 126, 406
See application file for complete search history.

(56) References Cited

U.S. PATENT DOCUMENTS 1,894,061 A 1/1933 Sanders
2,027,885 A 1/1936 Schwarzbach
(Continued)

FOREIGN PATENT DOCUMENTS

EP 2193830 A1 6/2010
EP 2468374 A1 6/2012
(Continued)

OTHER PUBLICATIONS

"U.S. Appl. No. 14/211,881, Non Final Office Action mailed Jan. 12, 2015", 12 pgs.
(Continued)

*Primary Examiner* — Gregory Binda
*Assistant Examiner* — Nahid Amiri
(74) *Attorney, Agent, or Firm* — Schwegman Lundberg & Woessner, P.A.

(57) ABSTRACT

A variety of connectors can be used to connect cylindrical or other shaped tubes to one another. The connectors incorporate features that may facilitate connecting the tubes at a wide range of angles to form a variety of multi-dimensional shapes, while obviating the need to use tape or glue. Such features can potentially improve the aesthetics and simplify the assembly of objects produced using the connectors. Further, structures produced using the connectors can be disassembled, facilitating reuse of, for example, the paper-based tubes of exhausted household products.

16 Claims, 24 Drawing Sheets

(51) Int. Cl.
*F16L 41/00* (2006.01)
*F16B 7/00* (2006.01)
*A63H 33/08* (2006.01)

(56) References Cited

U.S. PATENT DOCUMENTS

| | | | |
|---|---|---|---|
| 2,472,363 A | | 6/1949 | Blackinton |
| 2,633,662 A | | 4/1953 | Nelson |
| 2,691,243 A | | 10/1954 | Rade |
| 2,800,743 A | | 7/1957 | Meehan et al. |
| 2,832,100 A | | 4/1958 | Swallert |
| 2,984,935 A | | 5/1961 | Beck |
| 3,004,784 A | * | 10/1961 | Selby ................. 403/19 |
| 3,148,477 A | | 9/1964 | Bjorn et al. |
| 3,554,382 A | | 1/1971 | Grinbergs |
| 3,558,138 A | | 1/1971 | Lemelson |
| 3,564,758 A | | 2/1971 | Willis |
| 3,570,169 A | | 3/1971 | Jacob |
| 3,626,632 A | | 12/1971 | Bullock, Jr. |
| 3,698,124 A | * | 10/1972 | Reitzel et al. ............ 446/114 |
| 3,855,748 A | * | 12/1974 | Thomas ................... 52/578 |
| 3,940,100 A | * | 2/1976 | Haug ...................... 248/188.1 |
| 4,055,019 A | | 10/1977 | Harvey |
| 4,335,165 A | * | 6/1982 | Powers ................... 428/8 |
| 4,530,196 A | * | 7/1985 | O'Bryan ................ 52/745.05 |
| 4,550,543 A | | 11/1985 | Valenzano |
| 4,758,196 A | | 7/1988 | Wang |
| 4,789,370 A | * | 12/1988 | Ellefson ............ A63H 33/062 446/113 |
| 4,793,725 A | * | 12/1988 | Cheng ..................... 403/174 |
| 5,097,645 A | | 3/1992 | Sanderson |
| 5,121,526 A | * | 6/1992 | Burkard et al. ............. 24/336 |
| 5,273,477 A | | 12/1993 | Adams, Jr. |
| RE35,085 E | * | 11/1995 | Sanderson ................ 52/655.1 |
| 5,593,337 A | | 1/1997 | Lapointe |
| 5,601,470 A | | 2/1997 | Yao |
| 5,628,666 A | * | 5/1997 | Tomczyk et al. ........... 446/125 |
| 5,672,087 A | | 9/1997 | De La Paz Rizo et al. |
| 5,681,041 A | | 10/1997 | Coon |
| 5,833,512 A | | 11/1998 | Nicola |
| 5,853,313 A | | 12/1998 | Zheng |
| 5,895,306 A | | 4/1999 | Cunningham |
| 6,015,150 A | | 1/2000 | Giguere |
| 6,149,487 A | * | 11/2000 | Peng ...................... 446/114 |
| 6,179,681 B1 | | 1/2001 | Matos |
| 6,389,652 B1 | * | 5/2002 | Williams ............. 24/30.5 R |
| 6,422,909 B2 | | 7/2002 | Clever et al. |
| 6,558,222 B1 | | 5/2003 | Maddock |
| 6,592,421 B1 | * | 7/2003 | Clever .................... 446/108 |
| 6,626,732 B1 | * | 9/2003 | Chung .................... 446/387 |
| 6,672,931 B1 | | 1/2004 | Bagley |
| 6,758,333 B2 | * | 7/2004 | Sherman ................. 206/308.1 |
| 7,318,764 B2 | * | 1/2008 | Elias ..................... 446/108 |
| 7,371,146 B2 | * | 5/2008 | Scarborough ............. 446/85 |
| 7,469,898 B2 | | 12/2008 | Forakis |
| 7,708,317 B2 | * | 5/2010 | Leblanc .................. 285/31 |
| D623,241 S | * | 9/2010 | Ruble, IV ................ D21/488 |
| 7,833,077 B1 | | 11/2010 | Simmons, Jr. |
| 8,506,206 B2 | * | 8/2013 | Desmeules ............... 405/232 |
| 8,528,291 B2 | * | 9/2013 | Allred et al. ............. 52/655.1 |
| 8,621,739 B1 | | 1/2014 | Elliot |
| D717,884 S | * | 11/2014 | Duriez ................... D21/501 |
| 2002/0078653 A1 | | 6/2002 | Jean |
| 2002/0090881 A1 | | 7/2002 | Turnham |
| 2003/0054725 A1 | | 3/2003 | Liu |
| 2012/0000059 A1 | | 1/2012 | Fox et al. |
| 2012/0028534 A1 | | 2/2012 | Unger |
| 2013/0178129 A1 | | 7/2013 | Habibi |
| 2013/0230353 A1 | | 9/2013 | Murphy et al. |
| 2014/0270914 A1 | | 9/2014 | Nelson |

FOREIGN PATENT DOCUMENTS

| | | |
|---|---|---|
| WO | WO-7900567 A1 | 8/1979 |
| WO | WO-9304750 A1 | 3/1993 |
| WO | WO-9823347 A1 | 6/1998 |
| WO | WO-9830300 A1 | 7/1998 |
| WO | WO-9913954 A1 | 3/1999 |
| WO | WO-9925443 A1 | 5/1999 |
| WO | WO-2012041324 A1 | 4/2012 |
| WO | WO-2014144457 A1 | 9/2014 |

OTHER PUBLICATIONS

"International Application Serial No. PCT/US2014/028876, International Search Report mailed Aug. 8, 2014", 3 pgs.
"International Application Serial No. PCT/US2014/028876, Written Opinion mailed Aug. 8, 2014", 7 pgs.

* cited by examiner

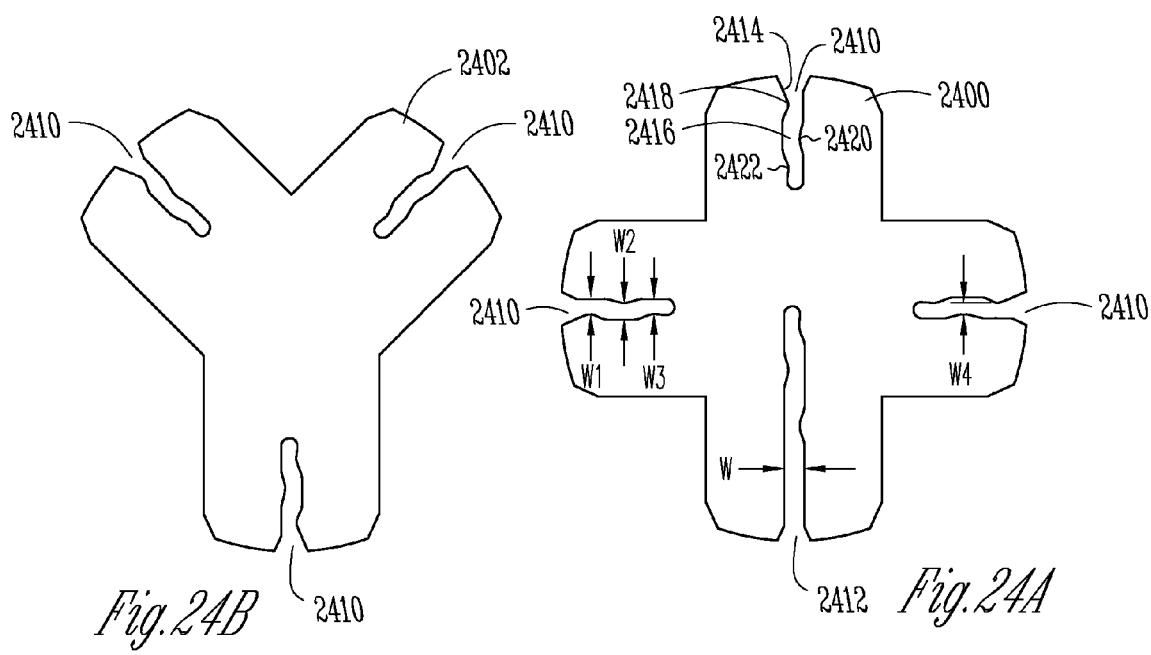
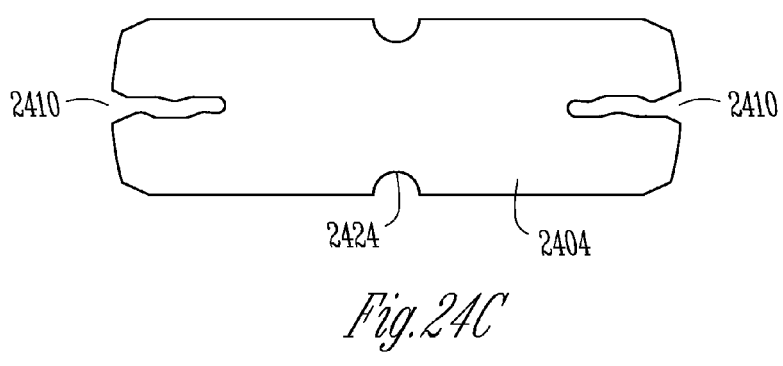

1

CONNECTOR DEVICES

CLAIM OF PRIORITY

This Application claims the priority benefit of U.S. Provisional Patent Application No. 61/789,347, filed Mar. 15, 2013, and 61/865,445, filed on Aug. 13, 2013, the entire contents of both of which are incorporated herein by reference.

BACKGROUND

This disclosure relates generally to connectors that can be employed in an amusement device or system.

Certain household products, such as bathroom tissue, paper towels, and aluminum foil are often sold rolled on paper cylinders or tubes. After these household products are exhausted, an issue remains relating to disposition of the paper cylinder or tube. Many consumers opt to discard the tubes. This is a convenient option, but contributes to volume of waste, for example, in landfills. Other consumers opt to recycle the tubes. This option is more environmentally friendly, but still involves the use of energy and other resources in the recycling process.

Still other consumers, particularly consumers with children, may repurpose the tubes for a variety of uses, including, for example, household and school projects. Many such projects may involve connecting paper tubes or cylinders together to form larger structures, such as, for example, simulated animals and buildings. Conventionally, paper tubes or cylinders may be connected to one another using tape or glue. This approach may present a number of challenges, such as, for example, connecting the tubes at uncommon angles, difficulty of assembly, and/or aesthetic challenges associated with excessive use of tape or glue.

SUMMARY

Examples according to this disclosure are directed to a variety of connectors, which can be used to connect cylindrical or other shaped tubes to one another. The connectors incorporate features that may facilitate connecting the tubes at a wide range of angles to form a variety of multi-dimensional shapes, while obviating the need to use tape or glue. Such features can potentially improve the aesthetics and simplify the assembly of objects produced using the connectors disclosed herein. Further, structures produced using the connectors disclosed herein can be disassembled, facilitating reuse of, e.g., the paper-based tubes of exhausted household products.

In one example, a connector includes a flat connector body having a uniform thickness, the connector body including a central region and two or more arms extending distally from the central region. At least one of the arms includes a width configured to be press fit into a tubular element of a household product and at least one slotted notch extends proximally from a distal end of the arm. The at least one slotted notch includes a slot portion including a width that is less than or equal to the thickness of the connector body.

In another example, a connector includes a flat connector body having a uniform thickness, the connector body including a central region and two or more arms extending distally from the central region. At least one of the arms includes a width configured to be press fit into a tubular element of a household product and at least one slotted notch extending proximally from a distal end of the arm. The at least one slotted notch includes a curved slot portion including a width that is greater than the thickness of the connector body.

In another example, a connector includes a substantially toric connector body including a uniform thickness, at least one triangular notch, and an inner diameter sized to receive a tubular element of a household product.

In another example, a system includes a first connector and a second connector. The first connector includes a flat connector body having a uniform thickness, the connector body including a central region and two or more arms extending distally from the central region. At least one of the arms includes a width configured to be press fit into a tubular element of a household product, and at least one slotted notch extending proximally from a distal end of the arm. The at least one slotted notch includes a slot portion including a width that is less than or equal to the thickness of the connector body. The second connector includes a substantially toric connector body including a uniform thickness, at least one triangular notch, and an inner diameter sized to receive a tubular element of a household product. The width of the at least one slotted notch is less than or equal to the thickness of the toric connector body.

In another example, a method includes adhering a plurality of layers of fiberboard to one another and cutting a connector from the adhered layers of fiberboard. The connector can include a flat connector body having a uniform thickness, the connector body including a central region and two or more arms extending distally from the central region. At least one of the arms can include a width configured to be press fit into a tubular element of a household product, and at least one slotted notch extending proximally from a distal end of the arm. The at least one slotted notch can include a slot portion including a width that is less than or equal to the thickness of the connector body.

In another example, a connector includes a flat connector body having a uniform thickness, the connector body including a central region and two or more arms extending distally from the central region. At least one of the arms includes a width configured to be press fit into a tubular element of a household product, and at least one slotted notch extending proximally from a distal end of the arm. The at least one slotted notch includes a slot portion including a distal protrusion defining a first width of the slot portion, a proximal protrusion defining a third width of the slot portion, and an intermediate protrusion defining a second width of the slot portion. The intermediate protrusion is arranged between the distal and proximal protrusions. The third width is less than the thickness of the circular connector body.

In another example, a connector includes a flat connector body having a uniform thickness, the connector body including a central region and two or more arms extending distally from the central region. At least one of the arms includes a width configured to be press fit into a tubular element of a household product, and at least one slot extending proximally from a distal end of the arm. The at least one slot includes a proximal protrusion defining a first width of the slot, and an intermediate protrusion arranged between the proximal protrusion and the distal end of the arm. The intermediate protrusion defines a second width of the slot, and the proximal and intermediate protrusions together define a third width of the slot. The first and second widths are each greater than or equal to the thickness of the connector body and the third width is less than the thickness of the connector body.

In another example, a connector includes a flat connector body having a uniform thickness, the connector body including a central region and two or more arms extending distally from the central region. At least one of the arms includes a width configured to be press fit into a tubular element of a household product, and a slot extending proximally from a distal end of the arm. The slot including three successively opposing protrusions that define two reduced slot widths including a first width equal to a distance between one protrusion and an opposing side of the slot and a second width equal to a distance between two protrusions. The first width is greater than or approximately equal to the thickness of the connector body, and the second width is less than the thickness of the connector body.

The details of examples of the disclosure are set forth in the accompanying drawings and the description below. Other features, objects, and advantages of examples according to this disclosure will be apparent from the description and drawings, and from the claims.

BRIEF DESCRIPTION OF DRAWINGS

FIGS. 24A-24C are plan views of a system of example connectors that can be used together in accordance with examples of this disclosure.

DETAILED DESCRIPTION

As noted above, examples according to this disclosure are directed to a variety of connectors, which can be used to connect cylindrical or other shaped tubes to one another. Connectors in accordance with this disclosure are configured to be connected to one another and to common exhausted household products to construct a large variety of multi-dimensional shapes/objects.

In one example, connectors in accordance with this disclosure form the building blocks of an amusement device or system, e.g. such as a toy or a game that users can use repeatedly to create different shapes/objects out of the waste products of common household items. For example, paper-based cylindrical tubes from paper towels and/or bathroom tissue can be connected via one or more connectors in accordance with this disclosure to create vehicles, people, robots, buildings, and a variety of other objects.

The connectors are configured to be universally connected to one another and to cylindrical tubes in virtually an infinite number of combinations. For example, the connector can include a flat connector body with a substantially uniform thickness. The connector body can include a central region and two or more arms extending distally from the central region. At least one of the arms has a width configured to be press fit into a tubular element of a household paper-based product, and includes at least one slotted notch extending proximally from a distal end of the arm. The slotted notch includes a slot portion including a width that is less than or equal to the thickness of the connector body.

In this example, the connector can be connected to a second connector in accordance with this disclosure by press fitting a portion of the second connector into the linear portion of the slotted notch of the first connector. Additionally, multiple cylindrical tubes can be coupled to the connector by press fitting the arms of the connector into the inner diameter of the tubes.

In another example, a connector includes a toric connector body. The connector body is flat and has a substantially uniform thickness. Additionally, the connector body includes at least one triangular notch extending radially inward from a periphery of the connector body. The inner diameter of the toric connector body is sized to receive a cylindrical tube of an exhausted household product.

In this example, the toric connector can be connected to a second connector in accordance with this disclosure by press fitting the flat toric body into a slotted notch of the second connector. Additionally, a cylindrical tube can be coupled to the toric connector by press fitting the outer diameter of the tube into the inner diameter of toric connector.

As used herein, "proximal" refers to a direction generally toward a central region of a connector in accordance with this disclosure, and "distal" refers to the opposite direction of proximal, i.e., away from the central region of the connector.

Figure 1:
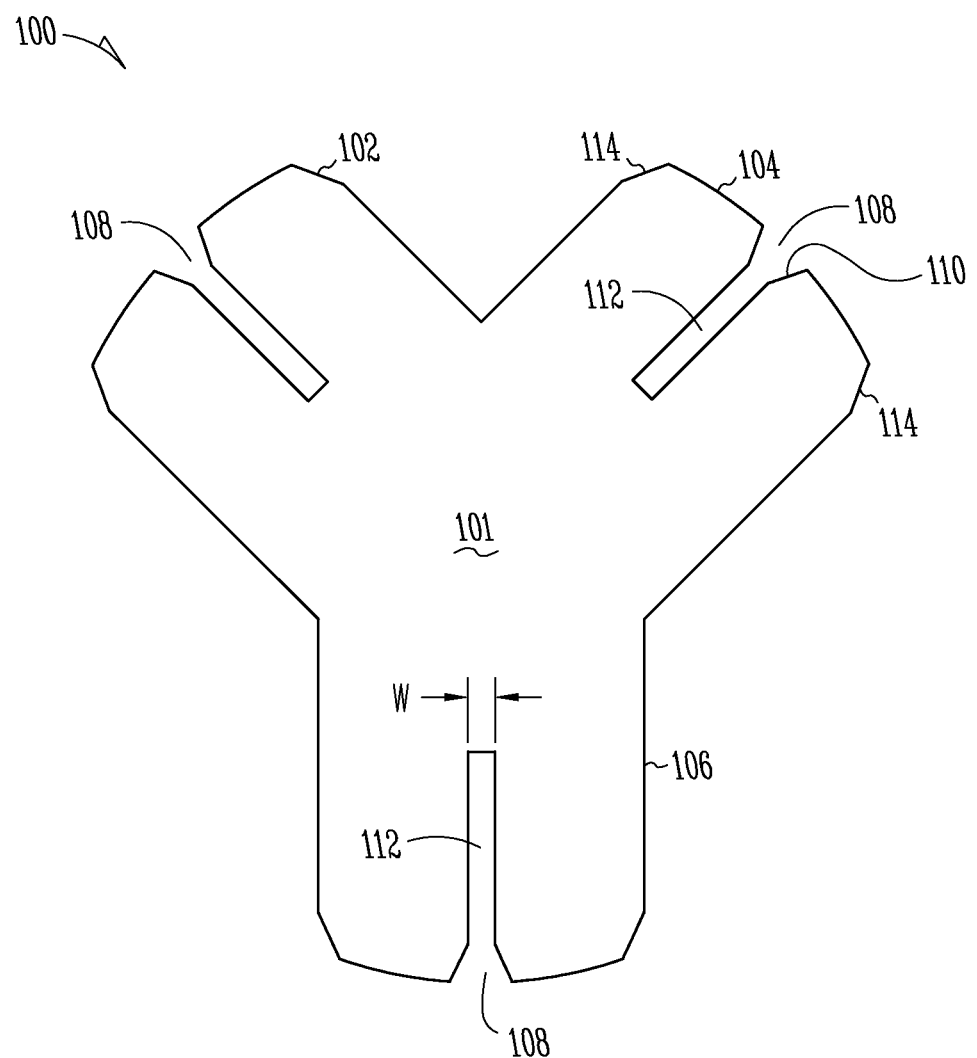
FIG. 1 is a plan view of an example connector in accordance with this disclosure.

FIG. 1 is a plan view of an example Y-type connector 100. The Y-type connector 100 is generally "Y" shaped with a central region 101 and three arms 102, 104, 106 extending distally from central region 101. Each of arms 102, 104, 106 includes a slotted notch 108 formed therein. The slotted notches 108 each have a substantially triangular portion 110 and a linear portion 112. Another way of describing slotted notch 108 and other such slotted notches in accordance with this disclosure is that the slotted notch includes a distal notch at the outer periphery of the connector and a slot extending proximally from the distal notch.

The linear portions 112 provide a friction or press-fit mechanism by which Y-type connector 100 can be interlocked with other connectors in accordance with this disclosure. For example, the linear portion 112 can include a width, W, that is less than the thickness of Y-type connector 100 and other connectors in accordance with this disclosure. Thus, two Y-type connectors or Y-type connector 100 and another connector in accordance with this disclosure can be interlocked with one another by pressing one connector into linear portion 112 of slotted notch 108. The undersized width of linear portion 112 relative to the thickness of the connector received in linear portion 112 functions to interlock the two connectors.

The triangular portion 110 of slotted notch 108 can also facilitate connecting Y-type connector 100 to other connectors in accordance with this disclosure. For example, the triangular portion 110 provides an opening to slotted notch 108 that is larger than linear portion 112. As such, the triangular portion 110 can function to guide placement of another connector into linear portion 112 to connect the two connectors to one another.

In one example, slotted notch 108, including triangular portion 110 and linear portion 112, is approximately 1.10 inches long. However, in other examples, slotted notch 108 can have a larger or smaller length. Thus, in some cases, the exact length of slotted notch 108 may be somewhat arbitrary. Additionally, the particular shape and sizing of triangular portion 110 or another notched opening of a slotted notch in accordance with this disclosure can differ from that shown in FIG. 1. Thus, in some cases, the exact size and shape of the notched opening of a slotted notch may be somewhat arbitrary.

Figure 11:
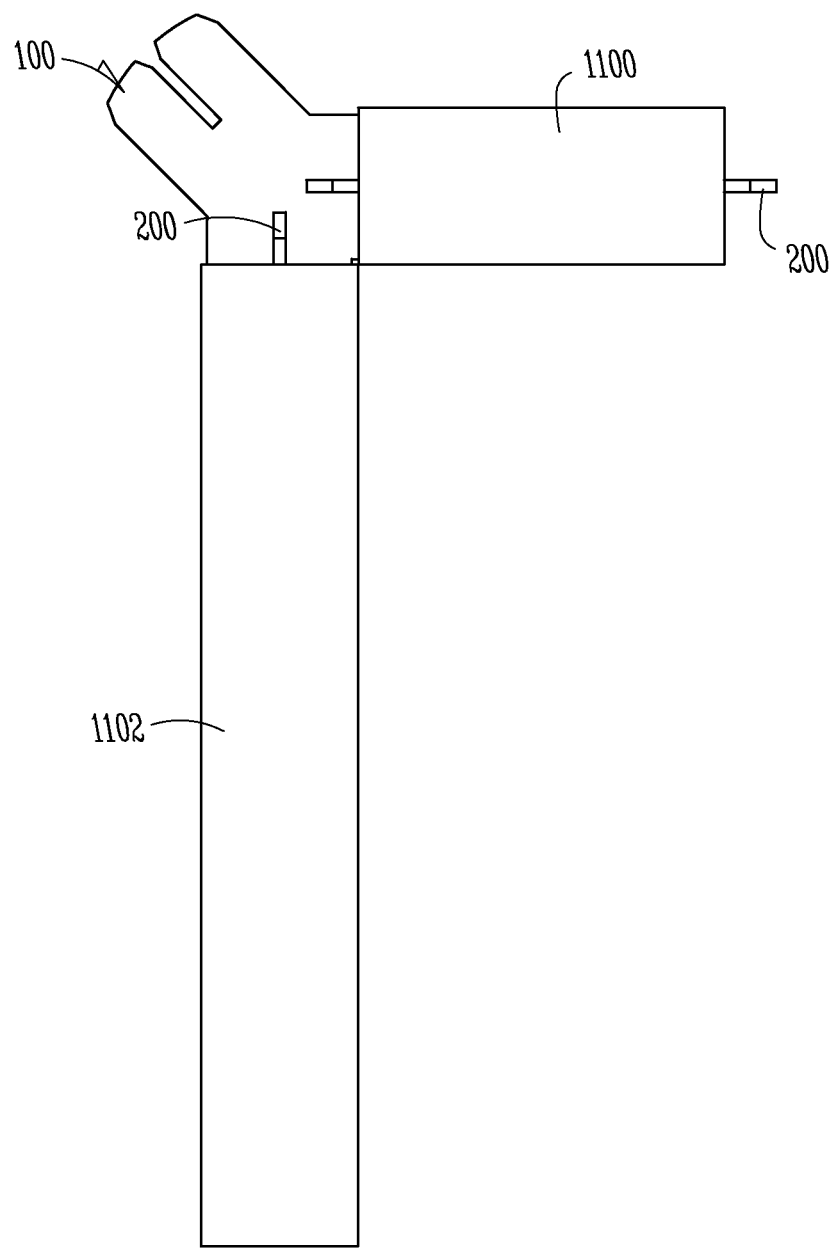
FIG. 11 is a perspective view of paper cylinders connected in one configuration using the connector of FIG. 1.
Figure 12:
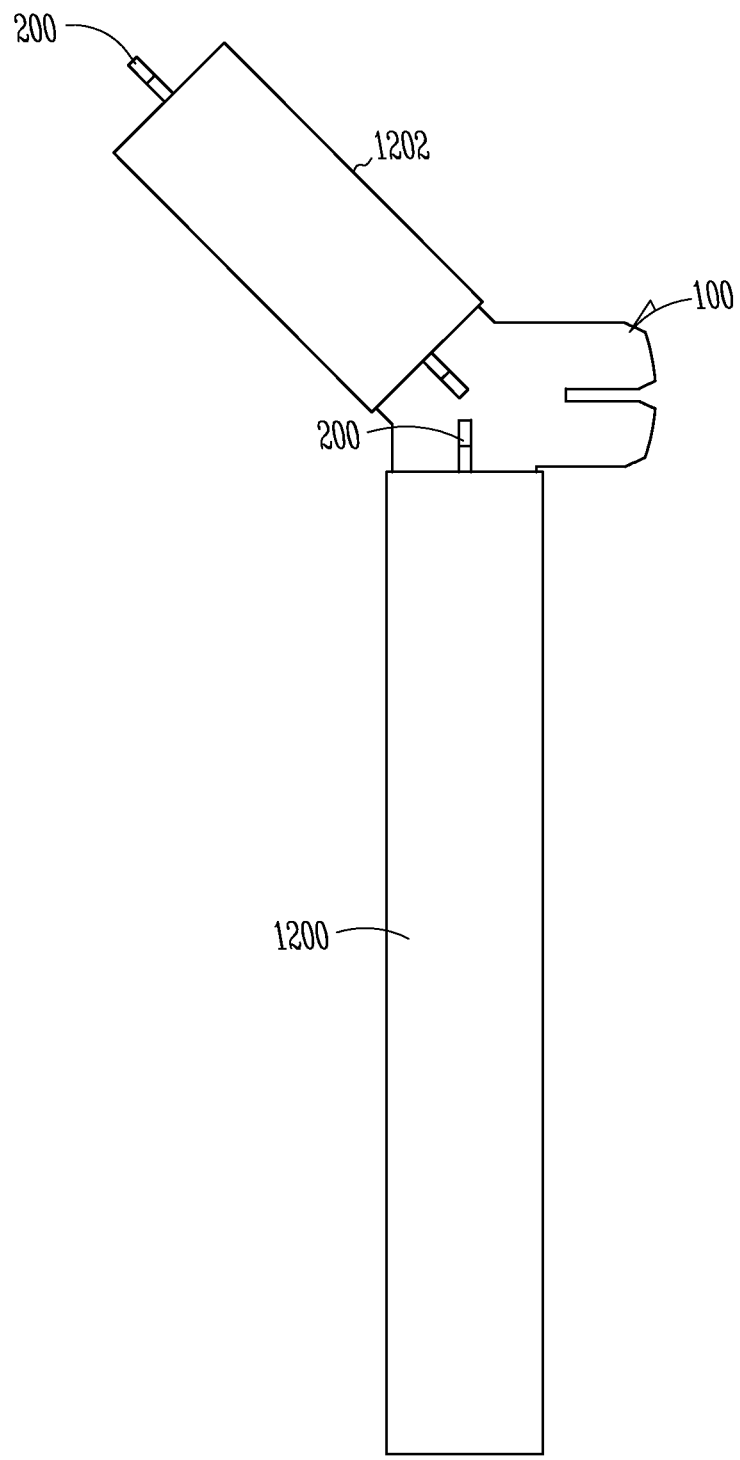
FIG. 12 is a perspective view of paper cylinders connected in another configuration using the connector of FIG. 1.

In the example shown in FIG. 1, the angle between arms 102 and 104 is approximately 90 degree. The angles between arms 102 and 106 and between arms 104 and 106 are approximately 135 degree. This variation in angles allows paper tubes or cylinders to be connected at either 90 degree or 135 degree angles, as shown in FIGS. 11 and 12 respectively, by selecting the arms to which paper tubes are connected. It will be appreciated that other examples of the Y-type connector 100 may have arms at different angles than shown in FIG. 1, e.g., evenly spaced at substantially 120 degree apart. More generally, the particular length, angle between, and shape of distally extending arms of connectors in accordance with this disclosure may, in some cases, be somewhat arbitrarily selected and many different particular configurations are possible.

In one example, the arms 102, 104, 106 are approximately 1.7 inches wide. This dimension is slightly larger than the inner diameter of a cylindrical tube of the type commonly used to package bathroom tissue or paper towels. Accordingly, when a cylindrical tube of an exhausted household product is connected to Y-type connector 100, a arm (102, 104, 106) of connector 100 applies pressure to the inner surface of the tube, facilitating a friction fit between connector 100 and the tube. In another example, arms 102, 104, 106 can have different widths that are adapted to be press fit into different sized tubes, e.g., different sized paper-based tubes of exhausted household products.

Arms 102, 104, 106 each include chamfers 114 on the distal end of each arm. Chamfers 114 can assist in press-fitting tubes onto arms 102, 104, 106 by providing a reduced width by which to initially insert the distal ends of arms 102, 104, 106 into the inner diameter of a tube.

In the example of FIG. 1, arms 102 and 104 are approximately the same length and arm 106 is longer than arms 102 and 104. For example, arms 102 and 104 extend distally from central region 101 of Y-type connector 100 by approximately the same distance, while arm 106 extends distally from central region 101 by a distance that is greater than arms 102 and 104. However, in other examples, arms extending distally from a central region of a connector in accordance with this disclosure can have all the same lengths.

Figure 2:
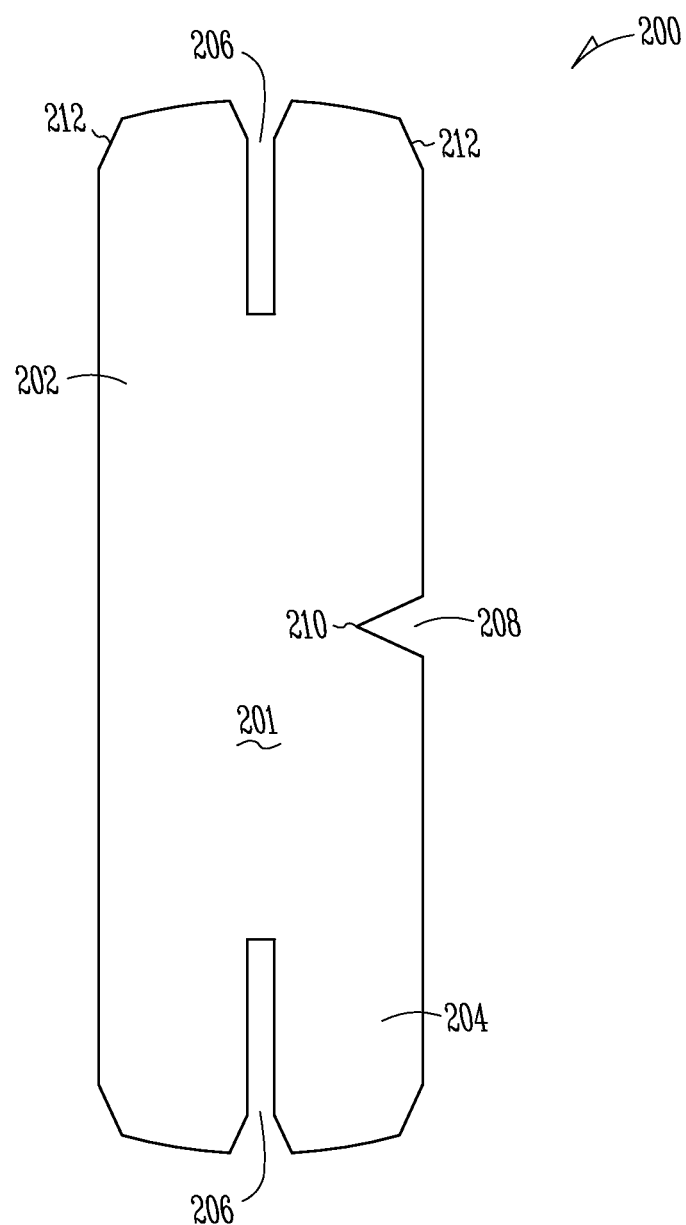
FIG. 2 is a plan view of another example connector.

FIG. 2 is a plan view of an example I-type connector 200 in accordance with this disclosure. I-type connector 200 is generally "I" shaped formed by a central region 201 and two arms 202, 204 extending distally from central region 201. The I-type connector 200 may be used, for example, to connect cylindrical tubes of an exhausted household product in a straight-line fashion or to connect to other connectors in accordance with this disclosure. I-type connector 200 has two slotted notches 206 extending proximally from distal ends of arms 202, 204. Slotted notches 206 can be shaped and function similarly to slotted notches 108 of Y-type connector 100.

In one example, slotted notches 206 are both approximately 1.10 inches long. However, in other examples, slotted notches 206 can have larger or smaller lengths. Additionally, slotted notches 206 have different lengths.

I-type connector 200 also includes a triangular notch 208. Triangular notch 208 can function as a guide for connecting I-type connector 200 to other connectors in accordance with this disclosure. In one example, triangular notch 208 can guide another connector in accordance with this disclosure to be connected to I-type connector 200 at a variety of angles relative to I-type connector 200. For example, I-type connector 200 can be received in a slotted notch of a second connector at triangular notch 208. After I-type connector 200 is pushed into the slotted notch of the second connector such that the proximal end of the notch is adjacent vertex 210 of triangular notch 208, the two connectors are connected to one another and the second connector can be rotated relative to I-type connector 200 to a desired angle. In one example, triangular notch 208 is approximately 0.35 inches deep and approximately 3/32 inches wide. However, in other examples, the size of triangular notch could be larger or smaller. In some examples, the size and shape of notch 208 could be arbitrarily selected.

In one example, the I-type connector 200 including arms 202, 204 is approximately 1.7 inches wide. This dimension is slightly larger than the inner diameter of a paper tube of the type commonly used to package bathroom tissue or paper towels. Accordingly, when such a tube is connected to connector 200, connector 200 applies pressure to the inner surface of the tube, facilitating a friction fit between connector 200 and the tube. In another example, I-type connector 200 including arms 202, 204 can have different widths that are adapted to be press fit into different sized tubes, e.g., different sized paper-based tubes of exhausted household products.

Arms 202, 204 each include chamfers 212 on the distal end of each arm. Chamfers 212 can assist in press-fitting tubes onto arms 202, 204 by providing a reduced width by which to initially insert the distal ends of arms 202, 204 into the inner diameter of a tube.

In one example, I-type connector 200 is approximately 5.5 inches long, which allows I-type connector 200 to be received within a standard bathroom tissue tube such that the distal ends of arms 202 and 204 extend slightly beyond the ends of the tube. In such an arrangement, I-type connector 200 can be coupled to the tube and additional connectors can be connected to the distal ends of arms 202 and 204.

Figure 3:
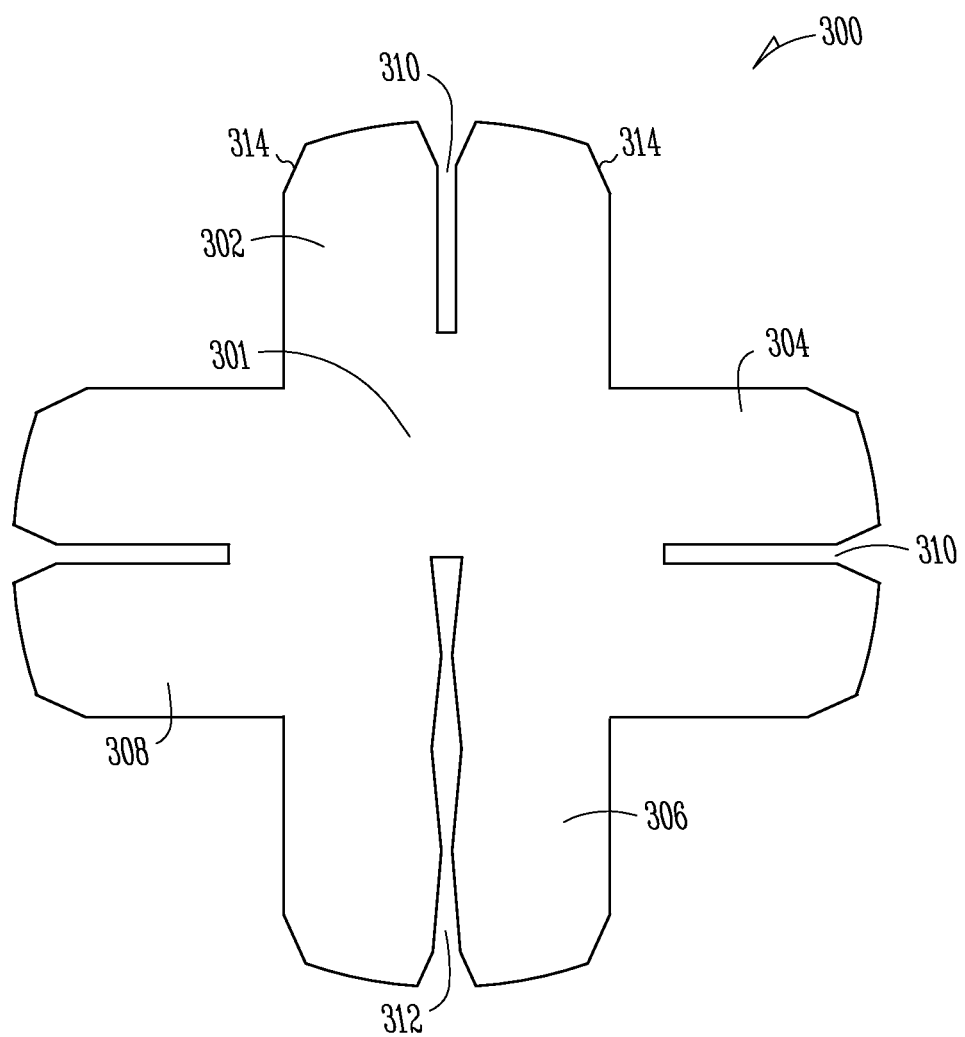
FIG. 3 is a plan view of another example connector.

FIG. 3 is a plan view of an example X-type connector 300 in accordance with this disclosure. The X-type connector 300 is generally "X" shaped with a central region 301 and four arms 302, 304, 306, 308 extending distally from central region 301. In one example, X-type connector 300 is approximately 4.5 inches from the distal end of arm 302 to the distal end of arm 306 and from the distal end of arm 304 to the distal end of arm 308. In one example, each arm 302, 304, 306, 308 is approximately 1.7 inches wide, which is slightly larger than the inner diameter of a paper tube of the type commonly used to package bathroom tissue or paper towels. In such cases, when such a paper tube is connected to connector 300, connector 300 applies pressure to the inner surface of the tube, facilitating a friction fit between connector 300 and the tube.

The arms 302, 304, and 308 may have slotted notches 310 that may be shaped similarly to the slotted notches 108 of FIG. 1. In the example of FIG. 3, arm 306 has a longer slotted notch 312, which, in one example, can be approximately 2.25 inches long. This longer slotted notch 312 facilitates connecting two X-type connectors 300 in an interlocking fashion.

Arms 302, 304, 306, 308 each include chamfers 314 on the distal end of each arm. Chamfers 314 can assist in press-fitting tubes onto arms 302, 304, 306, 308 by providing a reduced width by which to initially insert the distal ends of arms 302, 304, 306, 308 into the inner diameter of a tube.

In the example shown in FIG. 3, the respective angles between arms 302, 304, 306, 308 is approximately 90 degree. However, other examples of the X-type connector 300 may have arms at different angles than shown in FIG. 3. Additionally, arms 302, 304, 306, 308 are approximately the same length in the example of FIG. 3. However, in other examples, arms extending distally from a central region of an X-type connector in accordance with this disclosure can have different lengths.

Figure 4:
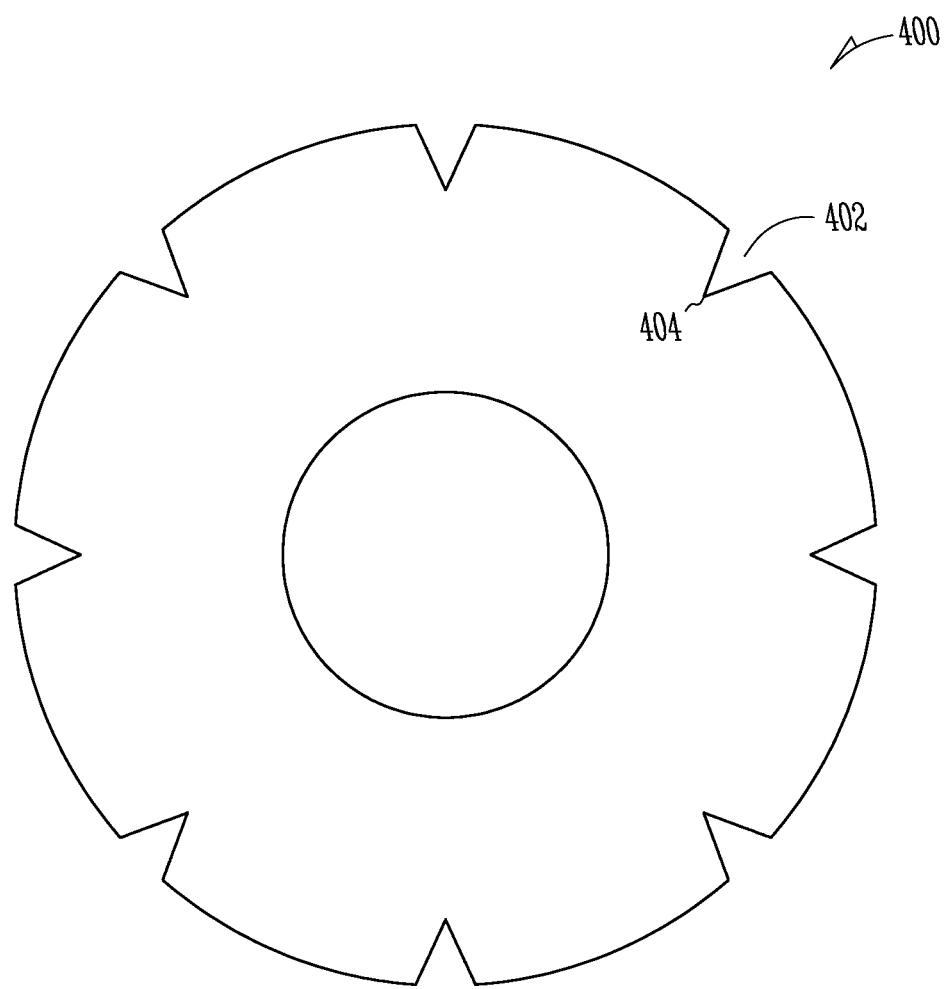
FIG. 4 is a plan view of another example connector.

FIG. 4 is a plan view of an example tonic connector 400 in accordance with this disclosure. Toric connector 400 is a generally circular, "O" shaped connector, which includes a number of triangle notches 402 formed around and extending proximally from the perimeter of the connector. In one example, toric connector 400 has an inner diameter of approximately 1.7 inches to allow a standard bathroom tissue or paper towel tube to be press fit into toric connector 400. In one example, toric connector 400 has an outer diameter of approximately 4.5 inches, which can be selected to size toric connector 400 similarly to one example of an X-type connector in accordance with this disclosure.

As noted, toric connector 400 includes a number of triangle notches 402 formed around the perimeter of the connector. The triangular notches 402 may be approximately 0.35 inches deep and approximately 3/32 inches wide. The triangular notches 402 may facilitate connection with other connector types disclosed herein at a variety of angles. For example, toric connector 400 can be received in a slotted notch of a second connector at triangular notch 402. After toric connector 400 is pushed into the slotted notch of the second connector such that the proximal end of the notch is adjacent vertex 404 of triangular notch 402, the two connectors are connected to one another and the second connector can be rotated relative to toric connector 400 to a desired angle.

Figure 5:
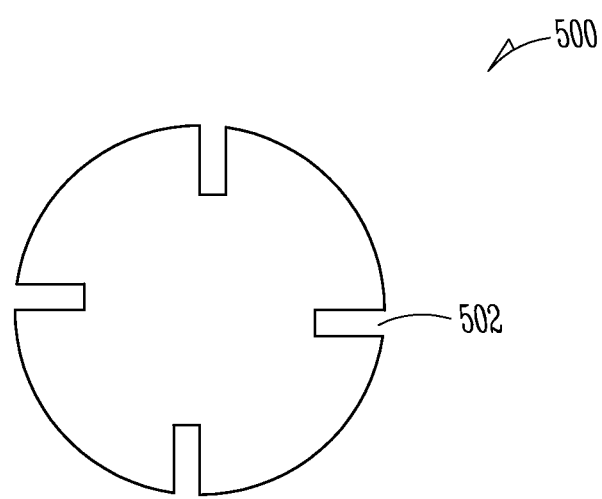
FIG. 5 is a plan view of another example connector.

FIG. 5 is a plan view of an example chip connector 500 in accordance with this disclosure. Chip connector 500 is generally circular and includes a number of slots 502 formed around and extending proximally from the perimeter of the connector. In one example, chip connector 500 has an outer diameter of approximately 1.7 inches and slots have a length of approximately 0.30 inches. Chip connector 500 can be connected to and can be interposed between multiple connectors in accordance with this disclosure. Additionally, chip connector 500 can be used to add stability to other links by extending out from existing slots. In one example, slots 502 are offset slightly from the center of chip connector 500, which can allow chip 500 it to connect to other connectors in particular orientations with respect to each other (see, e.g., the example of FIG. 22).

In one example the outer diameter of chip connector 500 is equal to the inner diameter of toric connector 400. In one example, chip connector 500 is formed from the material removed from the inner diameter of toric connector 400. For example, chip 500 may be removed from a stock material that has been or will be cut into toric connector 400. In one example, tonic connector 400 is formed by punching or cutting the outer diameter of connector 400 from a stock sheet material. Before, at the same time, or after the outer diameter of toric connector 400 is punched/cut from the stock sheet, a circular chip is cut to form the inner diameter of toric connector 400 and which can then be used as chip connector 500.

Figure 6:
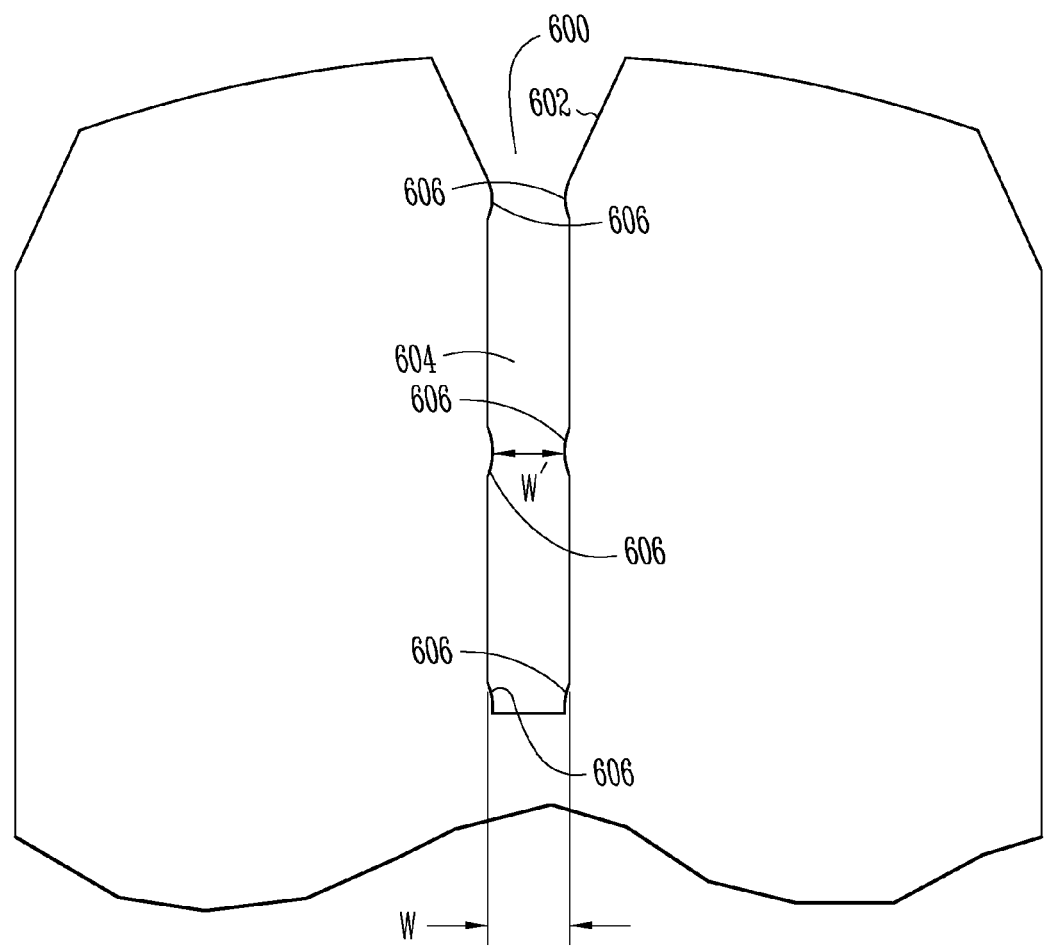
FIG. 6 is a detail view of a slotted notch of a connector in accordance with this disclosure.

FIG. 6 is a detail of a slotted notch 600 which may be included in a connector in accordance with this disclosure, including, e.g., in Y-type connector 100, I-type connector 200, and X-type connector 300. Slotted notch 600 extends proximally from the distal end of an arm of a connector and includes triangular portion 602 and linear portion 604.

Linear portion 604 can provide a friction or press-fit mechanism by which the connector including slotted notch 600 can be interlocked with other connectors in accordance with this disclosure. In one example, linear portion 604 can include a width, W, that is less than the thickness of connectors in accordance with this disclosure. Thus, two connectors can be interlocked with one another by pressing one connector into linear portion 604 of slotted notch 600. The undersized width of linear portion 604 relative to the thickness of the connector received in linear portion 604 functions to interlock the two connectors.

To increase the strength of the friction fit between the two connectors, linear portion 604 of slotted notch 600 includes a plurality of ridges 606 protruding from the sides of linear portion 604. Ridges 606 effectively reduce the width of linear portion to increase the strength of the friction fit between the connector including slotted notch 600 and a second connector. In one example, linear portion 604 can include the width, W, that is approximately equal to the thickness of connectors in accordance with this disclosure and the width, W', between adjacent ridges 606 can be less than the thickness of the connectors to provide an intermittent friction fit.

The number of ridges employed in slotted notch 600 can be important to the function of the connector. For example, if too many ridges are included in slotted notch 600 it can make connecting and disconnecting multiple connectors via slotted notch 600 difficult and not enjoyable. If too few ridges are included, on the other hand, the connection between connectors via slotted notch 600 may not as strong as desirable for constructing stable objects that can be used as amusement devices.

In the example of FIG. 6, linear portion 604 includes six ridges 606, including 3 ridges 606 on each side of linear portion 604. Two of ridges 606 are arranged adjacent the distal end of linear portion 604, two of ridges 606 are arranged adjacent the proximal end of linear portion 604, and the last two ridges 606 are arranged between the distal and proximal ends of linear portion 604.

In other examples, a slotted notch or slot or other aperture that provides a mechanism for press-fitting multiple connectors in accordance with this disclosure can have more or fewer ridges than slotted notch 600. For example, the longer slotted notch 312 of X-type connector 300 can include 10 ridges, including 5 ridges on each side of the linear portion of slotted notch 312. In the case of chip connector 500, slots 502 can each include two ridges, including one ridge on either side of slots 502.

Ridges 606 have a generally arcuate or curvilinear profile. However, in other examples, different shaped ridges can be used. For example, generally rectilinear ridges can be used that form a rectangular or square shaped protrusion that extends into a slot of a connector in accordance with this disclosure.

As illustrated by the foregoing examples, connectors in accordance with this disclosure are configured to be friction fit to one another and to tubes of exhausted household products to form a variety of shapes and objects. The connectors can be used in a wide variety of combinations to create different shapes and objects for amusement. Additionally, the connectors and tubes can be deconstructed and then reused for different projects.

The manner in which connectors are connected to one another is a slot in one connector that is undersized relative to the thickness of a second connector. Additionally, in some cases, the slot can include a number of ridges and slopes that extend into the slot and function to increase the strength of the friction fit between two connectors. A number of different connector thicknesses and slot widths can be employed. In one example, the thickness of connectors in accordance with this disclosure is in a range from approximately 0.125 to approximately 0.135 inches and the width of a slot varies from, e.g., approximately 0.125 inches to approximately 0.150 inches. In one example, the thickness of the connector is in a range from approximately 0.125 to approximately 0.135 inches, the overall width, W, of a slot is 0.135 inches, and the width, W', between ridges extending into the slot is in a range from approximately 0.10 to approximately 0.120 inches.

Connectors in accordance with this disclosure, including connectors 100, 200, 300, 400, and 500, can be fabricated from a variety of materials. For example, the connectors can be fabricated from a variety of plastics, woods, metals, and composites. In one example, the connectors are fabricated in part or in whole from non-toxic, recycled materials.

Connectors in accordance with this disclosure can be employed as part of or constitute an amusement device or system, including, e.g., a toy or game. The connectors can be used by people of a variety of ages, including young children. In the case of young children, it can be desirable to make the connectors both durable and non-toxic. Additionally, in an attempt to reduce the potential environmental impact of fabrication, the connectors can be made from recycled materials.

In one example, connectors in accordance with this disclosure are fabricated from a fiberboard material. Fiberboard can be a type of engineered wood product, which may be constructed from recycled wood fibers. Examples of fiberboards that can be used include particle board, medium-density fiberboard, and hardboard. Some fiberboards appropriate for use in the construction of connectors in accordance with this disclosure may be classified as "green" materials, which may include bio-based, secondary raw materials (wood chip or sugarcane fibers) recovered from certain distance from the manufacturing facilities. The resin or other binding agent used in this type of fiberboard can be an all-natural product, consisting of vegetable starch containing no added formaldehydes.

Figure 7:
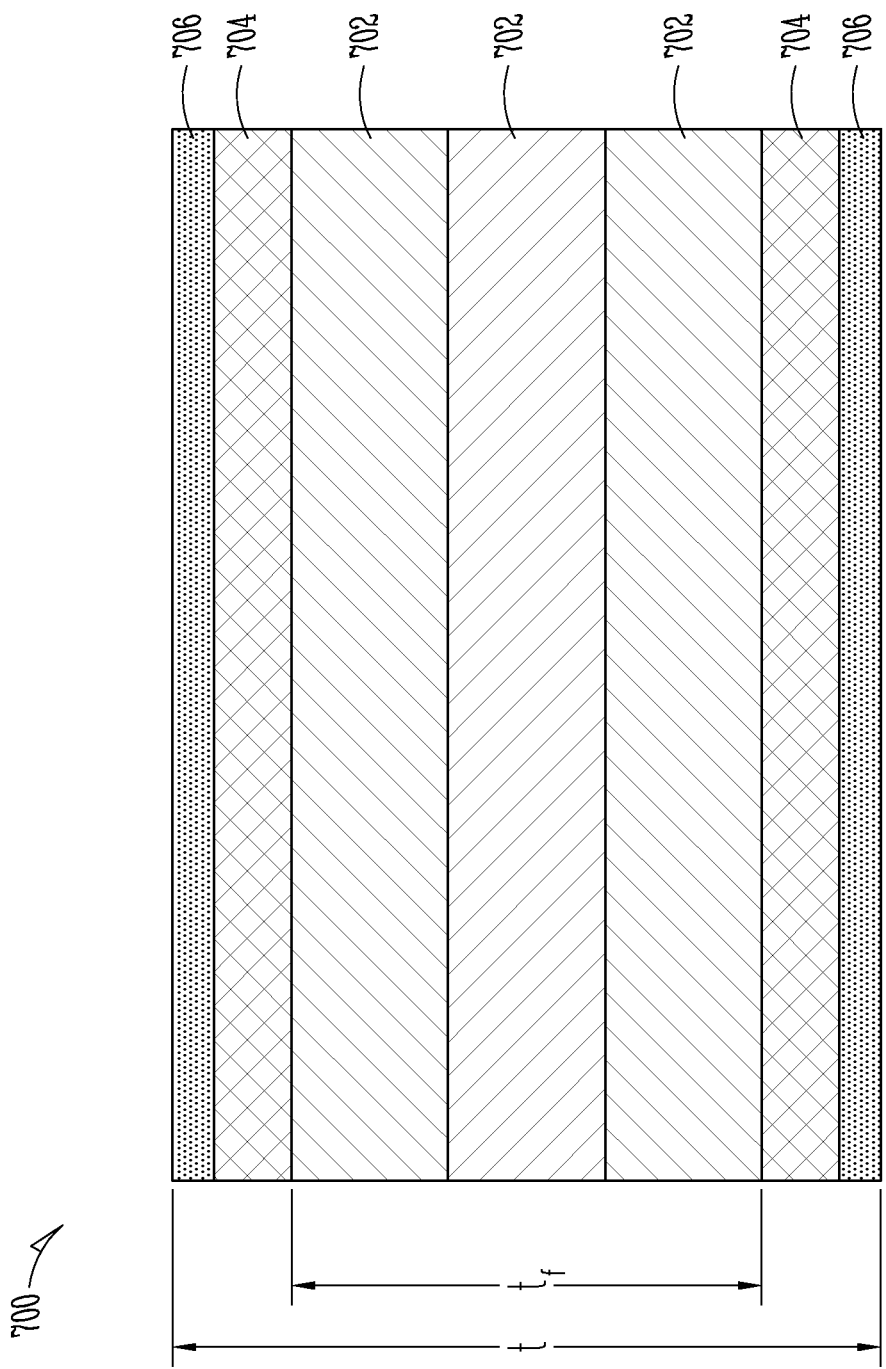
FIG. 7 is a partial section view of an example connector.

FIG. 7 depicts a partial cross-section of an example connector 700 constructed from fiberboard. In FIG. 7, connector 700 includes three fiberboard layers 702, two paper layers 704, and two seal layers 706. Fiberboard layers 702 and paper layers 704 can be connected using a variety of adhesives.

In one example, the combined thickness, $t_f$, of fiberboard layers 702 is approximately 0.125 inches. The thickness, t, of connector 700 including fiberboard layers 702, paper layers 704, and seal layers 706 can be approximately 0.135 inches. The layered fiberboard connector 700 is configured to be strong and durable enough for repeated use by a variety of users, including users prone to subject connector 700 to a high degree of wear, e.g. young children.

In some examples, connectors in accordance with this disclosure can be fabricated from a single layer of fiberboard. However, employing multiple layers, e.g., as in connector 700, may increase the strength, rigidity, and tear resistance of the connector. Fibers in a single layer of fiberboard may tend to be aligned with one another. However, when multiple different layers of fiberboard are adhered to one another, the fibers in each layer may be partially and evenly substantially misaligned with one another. The misalignment between fibers in the successive fiberboard layers can function to increase the structural integrity of the connector.

Paper layers 704 can be configured to provide a mechanism for providing connector 700 in a variety of colors and also for printing text and graphical content on the surfaces of connector 700. In one example, paper layers 704 can be died in a variety of colors, including, e.g., with a variety of vegetable-based dies such as soy-based dies. Additionally, trademarks, logos, pictures, user instructions, and a variety of other content can be printed on paper layers 704, including, e.g., by using lithography.

Seal layers 706 can be configured to provide another layer of protection to connector 700 against wear. Seal layers 706 can include a variety of non-toxic sealants, including, e.g., a variety of aqueous seals.

Connectors in accordance with this disclosure, including, e.g., connectors 100, 200, 300, 400, 500, and 700, can be manufactured using a variety of techniques. In one example, the connectors are manufactured using a laser cutting apparatus. In another example, the connectors are manufactured by using a die cutting apparatus. In the case of connectors manufactured from metals, such connectors could also be machined or cast. In the case of connectors manufactured from plastics, such connectors can be molded, including injection molded.

Figure 8:
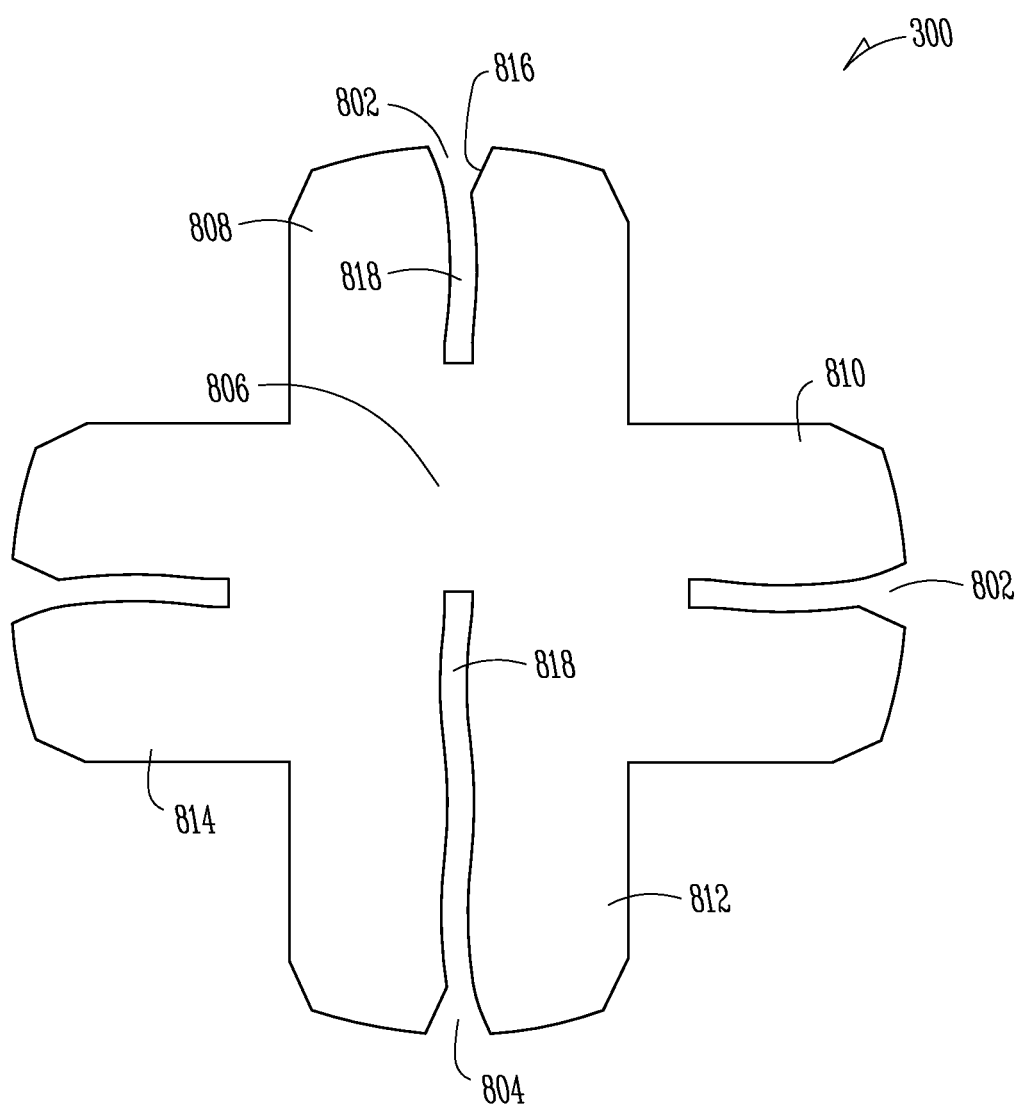
FIG. 8 is a plan view of another example connector.
Figure 9:
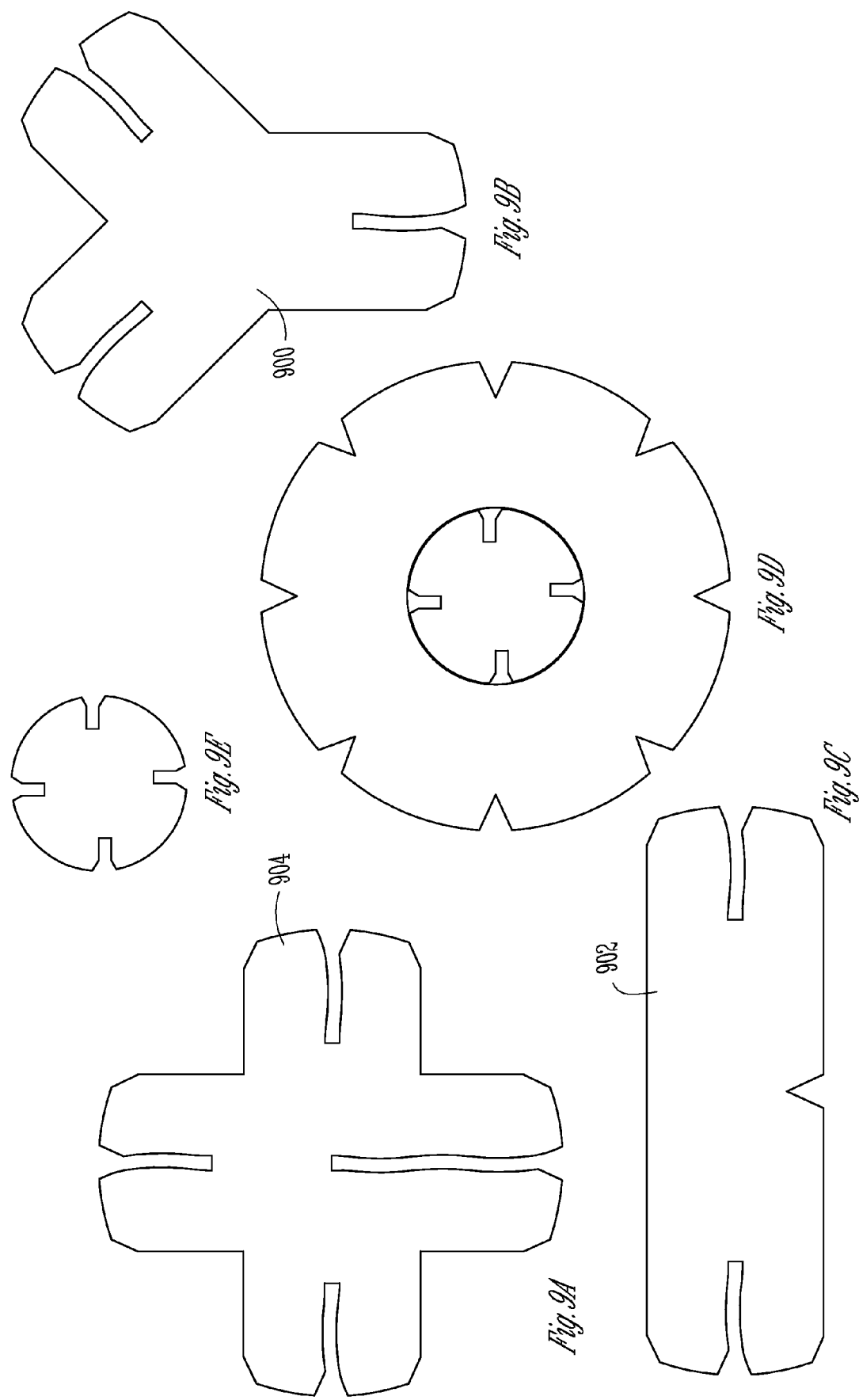
FIGS. 9A-9E are plan views of a system of example connectors that can be used together in accordance with examples of this disclosure.

FIG. 8 is a plan view of another example X-type connector 800 including alternative interlocking slotted notches 802 and 804 in accordance with this disclosure. The X-type connector 800 is generally "X" shaped with a central region 806 and four arms 808, 810, 812, 814 extending distally from central region 802.

The arms 808, 810, and 812 have slotted notches 802 and arm 814 has a longer slotted notch 804, which, in one example, can be approximately 2.25 inches long. This longer slotted notch 804 facilitates connecting two X-type connectors 800 in an interlocking fashion.

Slotted notches 802 and 804 differ from both the slotted notches of the examples of FIGS. 1-3 and with the notches with ridges of the example of FIG. 7. Slotted notches 802 and 804 include a generally triangular portion 816 and a curved portion 818. Both sides of the curved portion 818 of slotted notches 802 and 804 curve in the same direction such that the gap defined by the notches forms a curve. In the case of slotted notches 802, the curved portion 818 includes one inflection to form an arcuate curve, but, in the case of slotted notch 804, the curved portion 818 includes multiple inflections to form an undulating, wave-like curve.

Slotted notches 802 and 804 may function to interlock different connectors in accordance with this disclosure. However, slotted notches 802 and 804, in some cases, may not be configured to couple multiple connectors via a press-fit connection that uses friction to removably fix two or more connectors to one another. Instead, curved portion 818 of slotted notches 802 and 804 may be sized with a width that is larger than the thickness of the connector. In one example in which connector 800 includes a thickness of approximately 0.135 inches, curved portion 818 includes a width of approximately 0.150 inches. The curved shape of curved portion 818 causes a second connector received in one of slotted notches 802 or 804 to bend to conform to the curved shape of slotted notches 802 or 804, which removably couples the second connector to connector 800.

The curved slotted notches illustrated with reference to X-type connector 800 of FIG. 8 can be employed in any connector in accordance with this disclosure, including, e.g., Y-type, I-type, toric, and chip connectors similar to the examples described with reference to FIGS. 1, 2, 4, and 5, respectively. FIGS. 9A-9E are plan views depicting a set of connectors in accordance with this disclosure including Y-type connector 900, I-type connector 902, and X-type connector 904, each of which includes slotted notches with curved interlocking portions.

Figure 10:
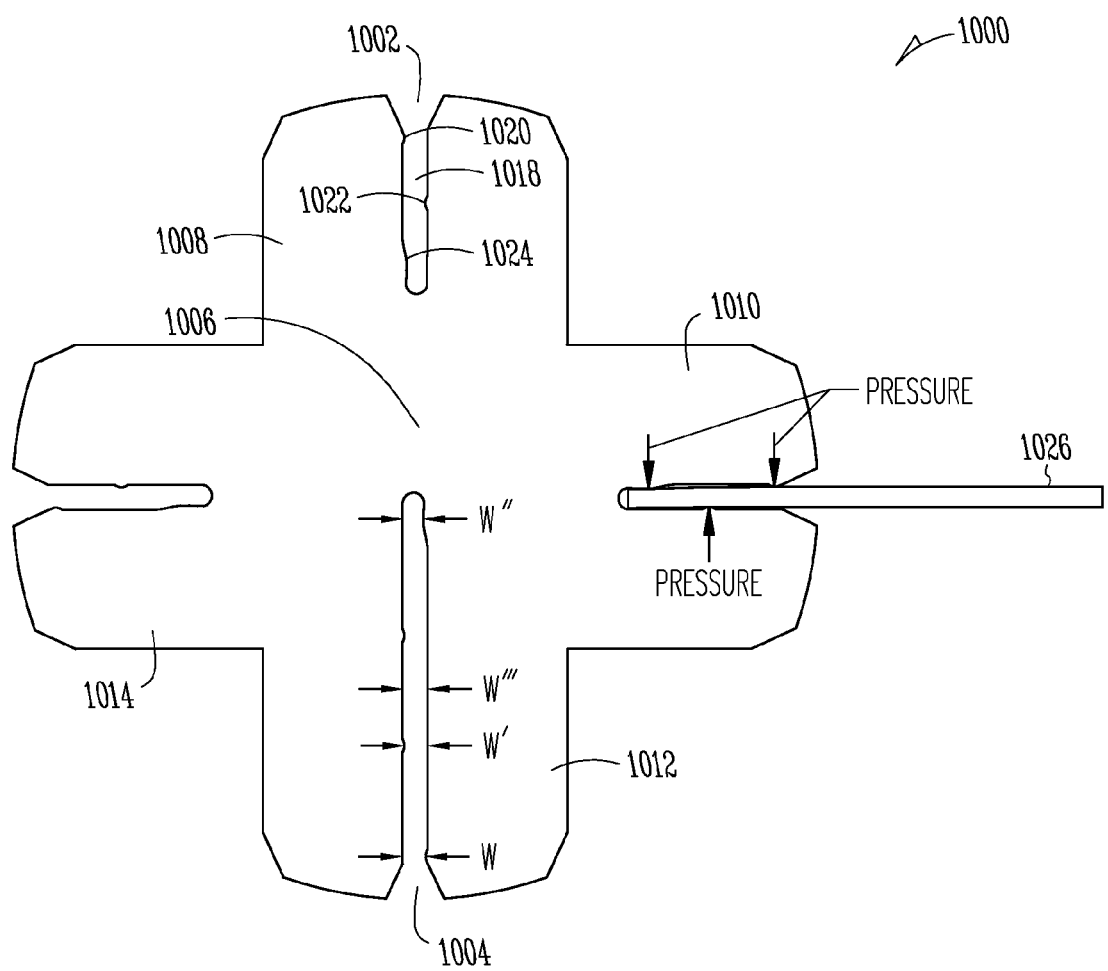
FIG. 10 is a plan view of another example connector.

FIG. 10 is a plan view of another example X-type connector 1000 including alternative interlocking slotted notches 1002 and 1004 in accordance with this disclosure. The X-type connector 1000 is generally "X" shaped with a central region 1006 and four arms 1008, 1010, 1012, 1014 extending distally from central region 1002.

The arms 1008, 1010, and 1012 have slotted notches 1002 and arm 1014 has a longer slotted notch 1004, which, in one example, can be approximately 2.25 inches long. This longer slotted notch 1004 facilitates connecting two X-type connectors 1000 in an interlocking fashion.

Slotted notches 1002 and 1004 differ from both the slotted notches of the examples of FIGS. 1-3, the slotted notches with ridges of the example of FIG. 7, and the slotted notches with curved portions of FIG. 8. Slotted notches 1002 and 1004 include a generally triangular portion 1016 and a linear portion 1018. Linear portion 1018 is sized such that the width varies along the length from triangular portion to the proximal end of slotted notches 1002 and 1004. The variations in linear portion 1018 are defined by distal ridge 1020, intermediate ridge(s) 1022, and ramp 1024. Linear portion 1018 includes a first width, W, between distal ridge 1020 and the side of linear portion 1018 opposite distal ridge 1020. Linear portion 1018 includes a second width, W', between intermediate ridge(s) 1022 and the side of linear portion 1018 opposite intermediate ridge(s) 1022. Additionally, linear portion 1018 includes a third width, W", at the proximal end of slotted notches 1002 and 1004. The overall width, W''', of linear portion is between opposite sides of the slot without any protrusion, e.g. ridge or ramp, that effectively reduces the width of the slot.

Linear portion 1018 of slotted notch 1002 includes one intermediate ridge 1022 and linear portion 1018 of slotted notch 1004 includes two intermediate ridges 1004. In other examples, slotted notches of connectors in accordance with this disclosure could include more than two intermediate ridges, depending on the length of the linear portion of the slotted notch.

Slotted notches 1002 and 1004 may function to interlock different connectors in accordance with this disclosure. In one example, the first and second widths, W and W', respectively, are substantially equal, the third width, W", is less than the first and second widths, and the overall width, W''', is greater than the first, second, and third widths. Slotted notches 1002 and 1004 may be configured to couple connector 1000 to a second connector in accordance with this disclosure by allowing the second connector to be loosely inserted into slotted notches 1002 and 1004 until the second connector is pushed to the proximal end of the slotted notch.

For example, the first, second, and overall widths, W, W', and W''', respectively, of linear portion 1018 can be greater than the thickness of connector 1000. Additionally, the third width, W", of linear portion 1018 at the proximal end can be less than the thickness of connector 1000. In this case, a second connector can be inserted into slotted notches 1002 and 1004 such that the second connector is uncoupled to connector 1000 until it is pushed to the proximal end of the slotted notch. When the second connector is pushed into the third width, W", of the proximal end of linear portion 1018, the second connector becomes locked to connector 1000 as the second connector is press-fit into the proximal end of the slot and compressed between distal ridge 1020 and intermediate ridge(s) 1022. This is schematically illustrated in FIG. 10, with connector 1026 connected to connector 1000.

In one example in which connector 1000 has a thickness in a range from approximately 0.125 to approximately 0.135 inches, the first and second widths, W and W', respectively, are approximately equal to 0.140 inches. In one example, the third width, W", is approximately equal to 0.128 inches and the overall width of slotted notches 1002 and 1004 are approximately equal to 0.150 inches.

One advantage of the slotted notches 1002 and 1004 of connector 1000 may be to provide a secure interlock between multiple connectors in accordance with this disclosure, while simultaneously reducing wear on the connector from repeatedly connecting and disconnecting them to one another. For example, as second connector 1026 can be loosely inserted into the slotted notches 1002 and 1004 until the proximal end, second connector 1026 may be less susceptible to portions of slotted notches 1002 and 1004 rubbing and abrading the faces of the connector during repeated connection and disconnection.

The slotted notches illustrated with reference to X-type connector 1000 of FIG. 10 can be employed in any connector in accordance with this disclosure, including, e.g., Y-type, I-type, toric, and chip connectors similar to the examples described with reference to FIGS. 1, 2, 4, and 5, respectively.

Connectors in accordance with this disclosure can be connected to one another and to a variety of tubes to form a variety of shapes. FIGS. 11-22 depict example connectors in connected to one another and to paper-based tubes of exhausted paper towels and bathroom tissues to form a number of example configurations. The examples of FIGS.

11-22 are not exhaustive of the different configurations possible. Instead, these examples illustrate the wide variety of different shapes and configurations that can be constructed using connectors in accordance with this disclosure.

For example, FIG. 11 is a perspective view of paper cylinders 1100, 1102 connected at a substantially 90 degree angle via one Y-type connector 100 and two I-type connectors 200. As another example, FIG. 12 shows paper cylinders 1200, 1202 connected at a substantially 125 degree angle via one Y-type connector 100 and two I-type connectors 200.

Figure 13:
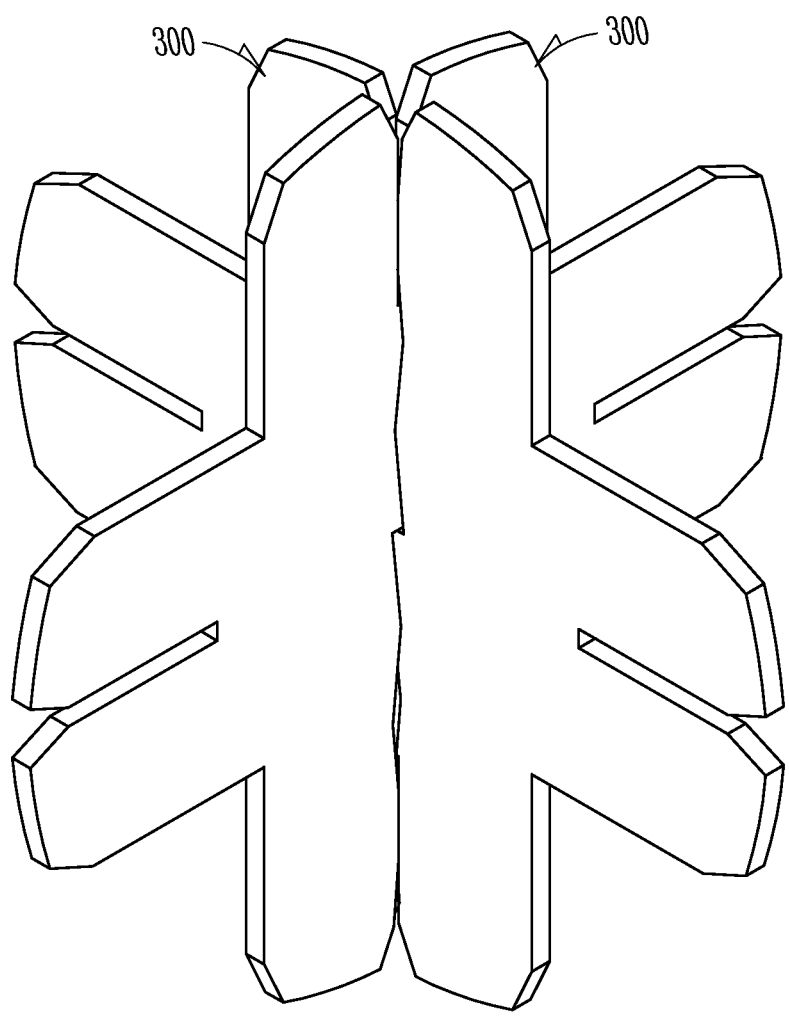
FIG. 13 is a perspective view of two interlocked connectors of the type shown in FIG. 3.

FIG. 13 is a perspective view of two interlocked X-type connectors 300. The X-type connectors 300 may interlock with one another along their respective slotted notches 312. Narrow portions of the slotted notches 312 may cooperate with each other to provide a friction fit to prevent the X-type connectors 300 from disengaging from one another. In another example, two X-type connectors 800 could be connected via curved slotted notches 804 in a similar manner as shown in FIG. 13.

Figure 14:
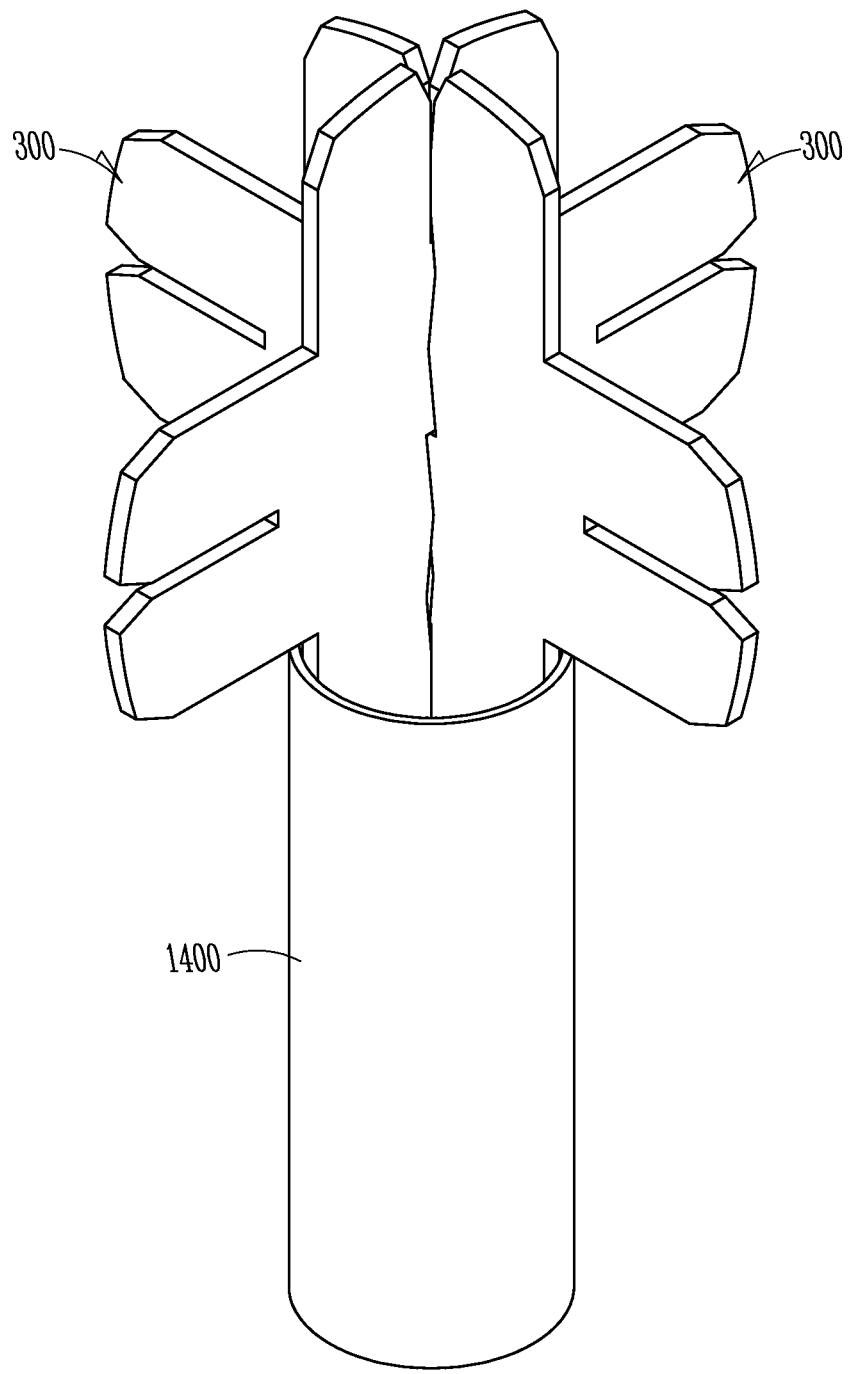
FIG. 14 is a perspective view of a paper cylinder connected to the interlocked connectors of FIG. 13.
Figure 15:
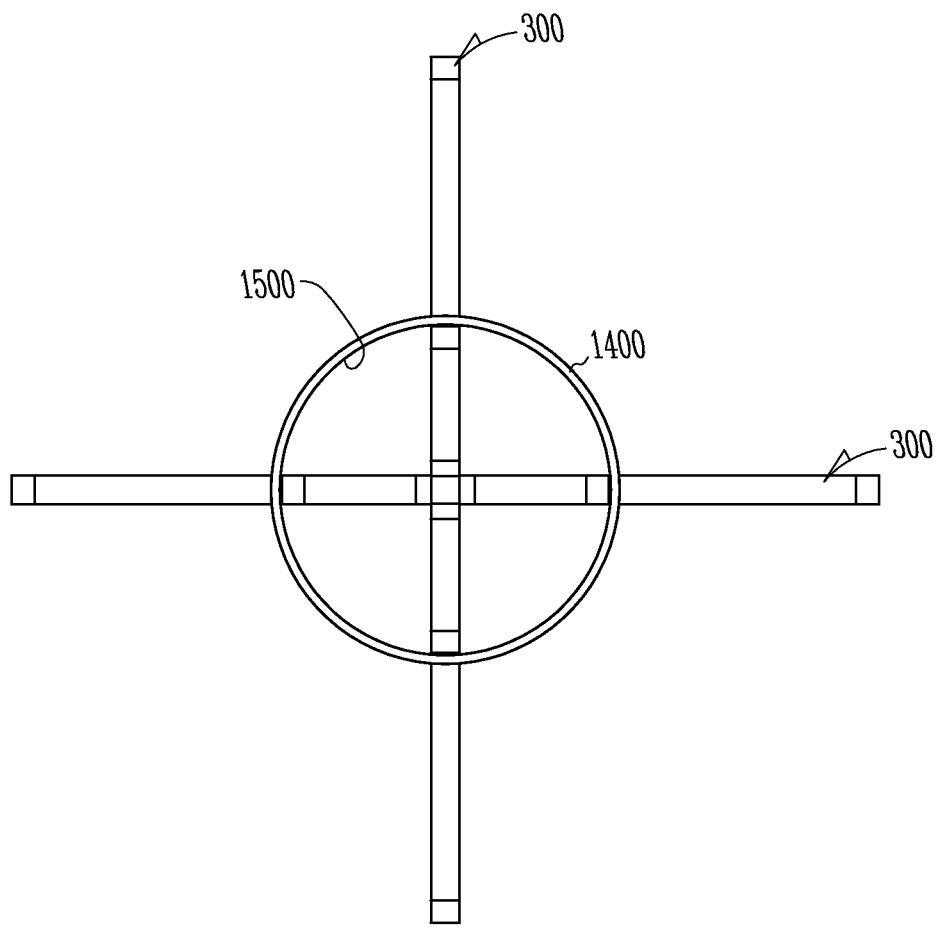
FIG. 15 is another perspective view of the configuration shown in FIG. 14.

With the X-type connectors 300 interlocked as shown in FIG. 13 (or two X-type, a three-dimensional connector may be formed that can receive paper tubes or cylinders at a number of connection points, e.g., six connection points. FIGS. 14 and 15, for example, illustrate a paper cylinder 1400 connected at one such connection point 1500 of a three-dimensional connector formed by interlocking two X-type connectors 300. As shown in FIG. 15, the connection point 1500 exerts a force at the inner diameter of the paper cylinder 1400, facilitating a friction fit between the X-type connectors 300 and the paper cylinder 1400 and preventing the paper cylinder 1400 from disengaging from the X-type connectors 300.

Figure 16:
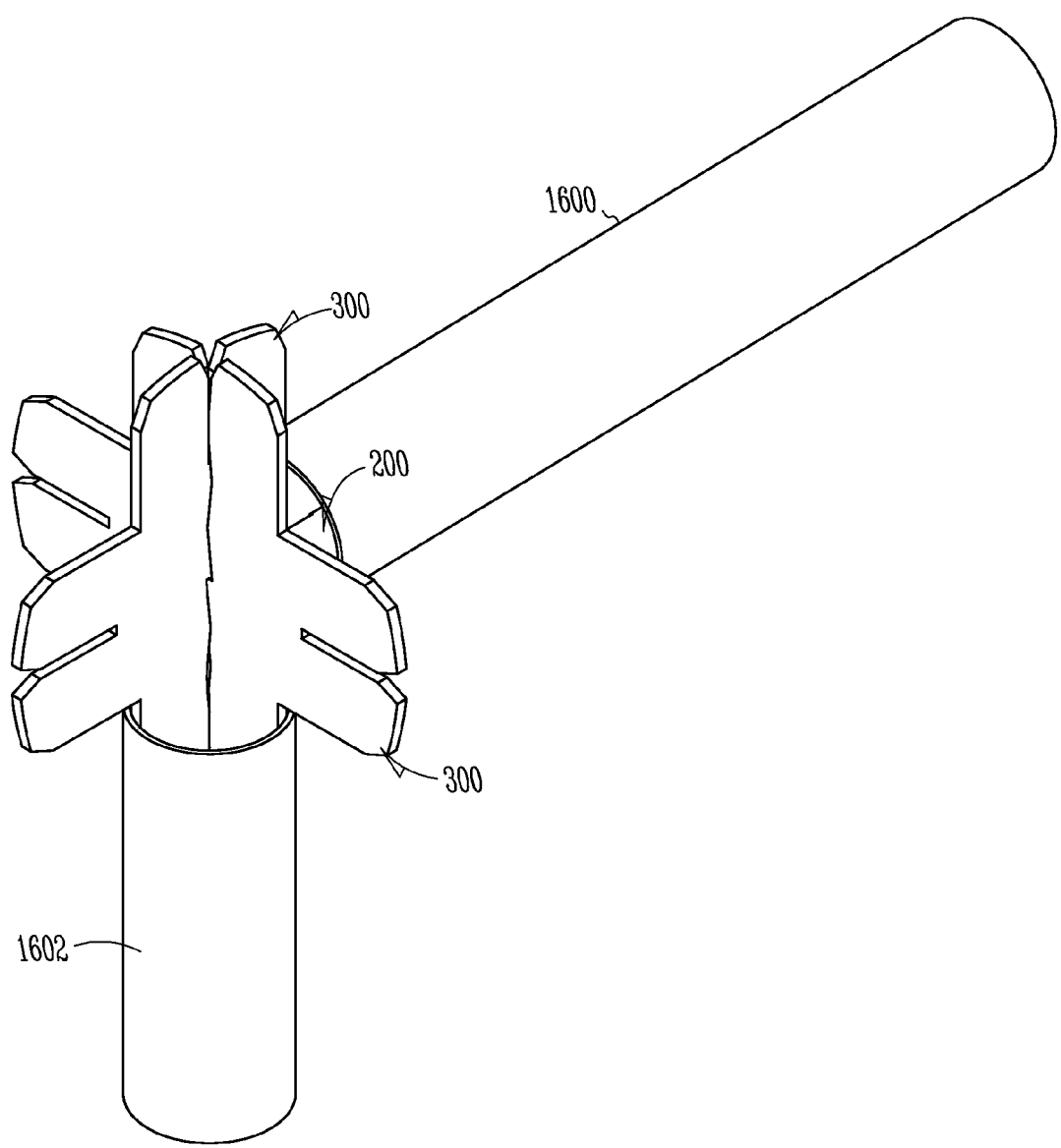
FIG. 16 is a perspective view of two paper cylinders connected to the interlocked connectors of FIG. 13.
Figure 17:
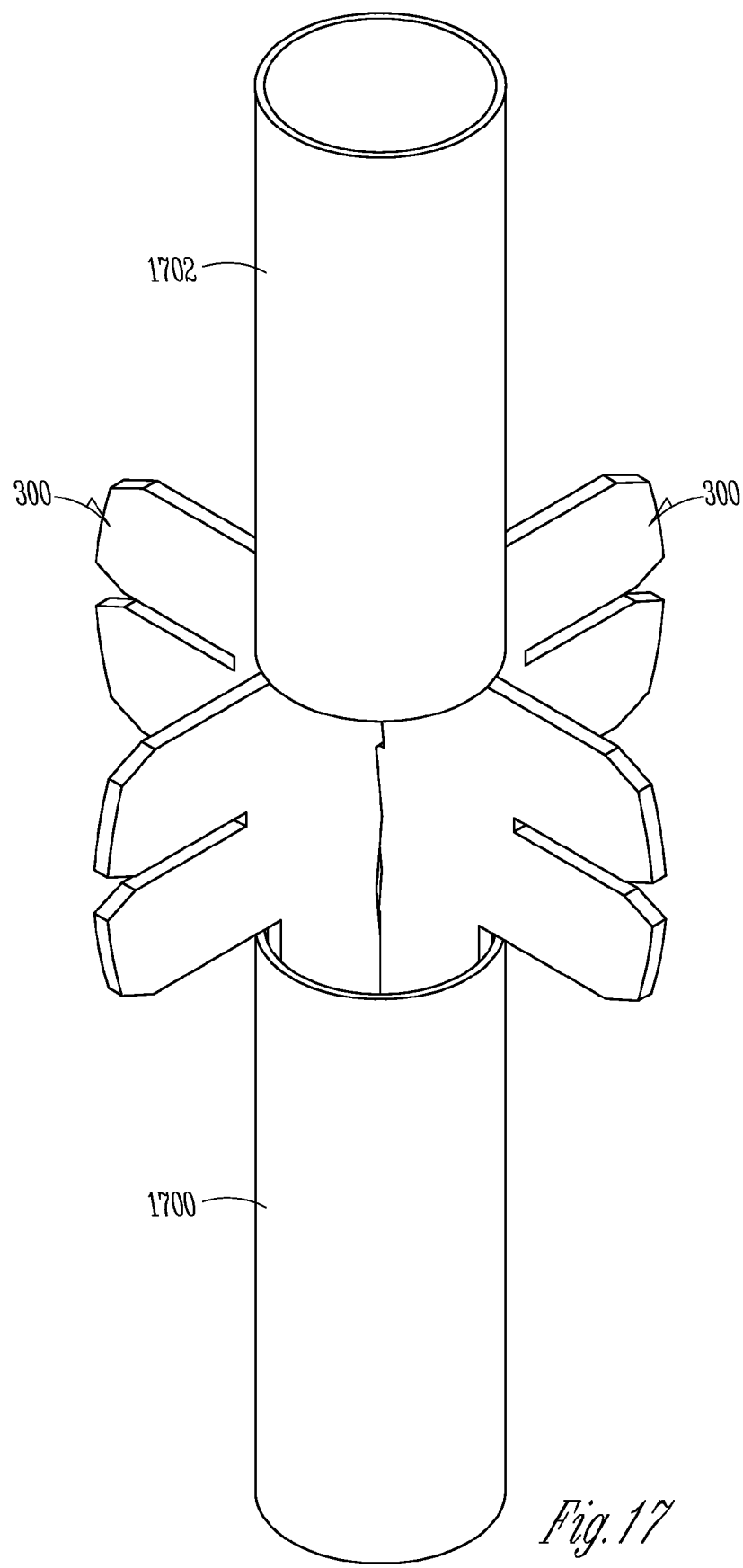
FIG. 17 is a perspective view of two paper cylinders connected to the interlocked connectors of FIG. 13 in another configuration.

FIG. 16 is a perspective view of two paper cylinders 1600, 1602 connected to interlocked X-type connectors 300. The paper cylinders 1600, 1602 are substantially orthogonal to one another. FIG. 17 shows two paper cylinders 1700, 1702 connected to interlocked X-type connectors 300 in a substantially linear fashion.

Figure 18:
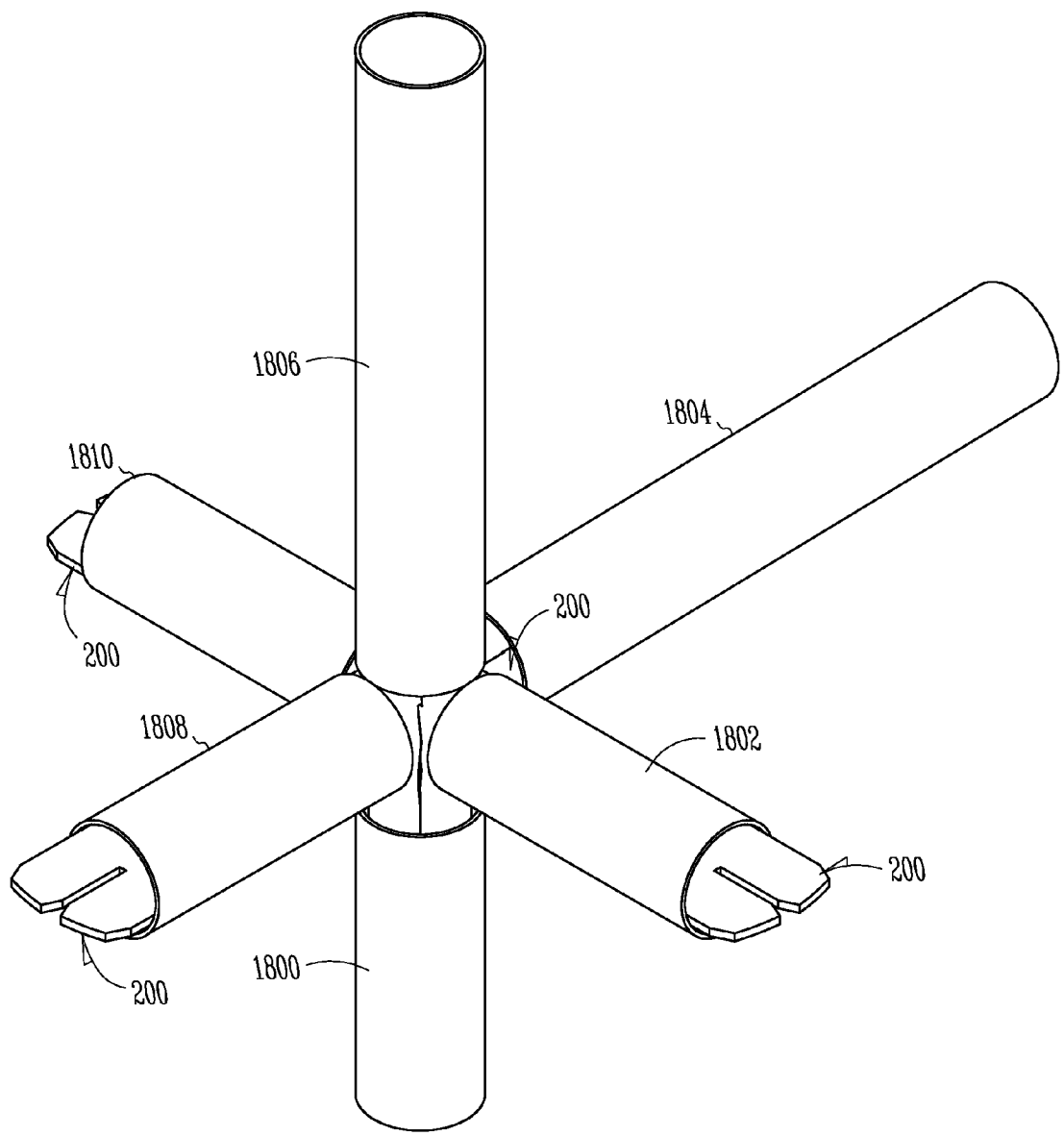
FIG. 18 is a perspective view of a number of paper cylinders connected to the interlocked connectors of FIG. 13.

FIG. 18 is a perspective view of a number of paper cylinders 1800, 1802, 1804, 1806, 1808, 1810 connected to interlocked X-type connectors 300. I-type connectors 200 may be connected to one or more of the paper cylinders, e.g., paper cylinders 1800 and 1808, as shown in FIG. 18.

Figure 19:
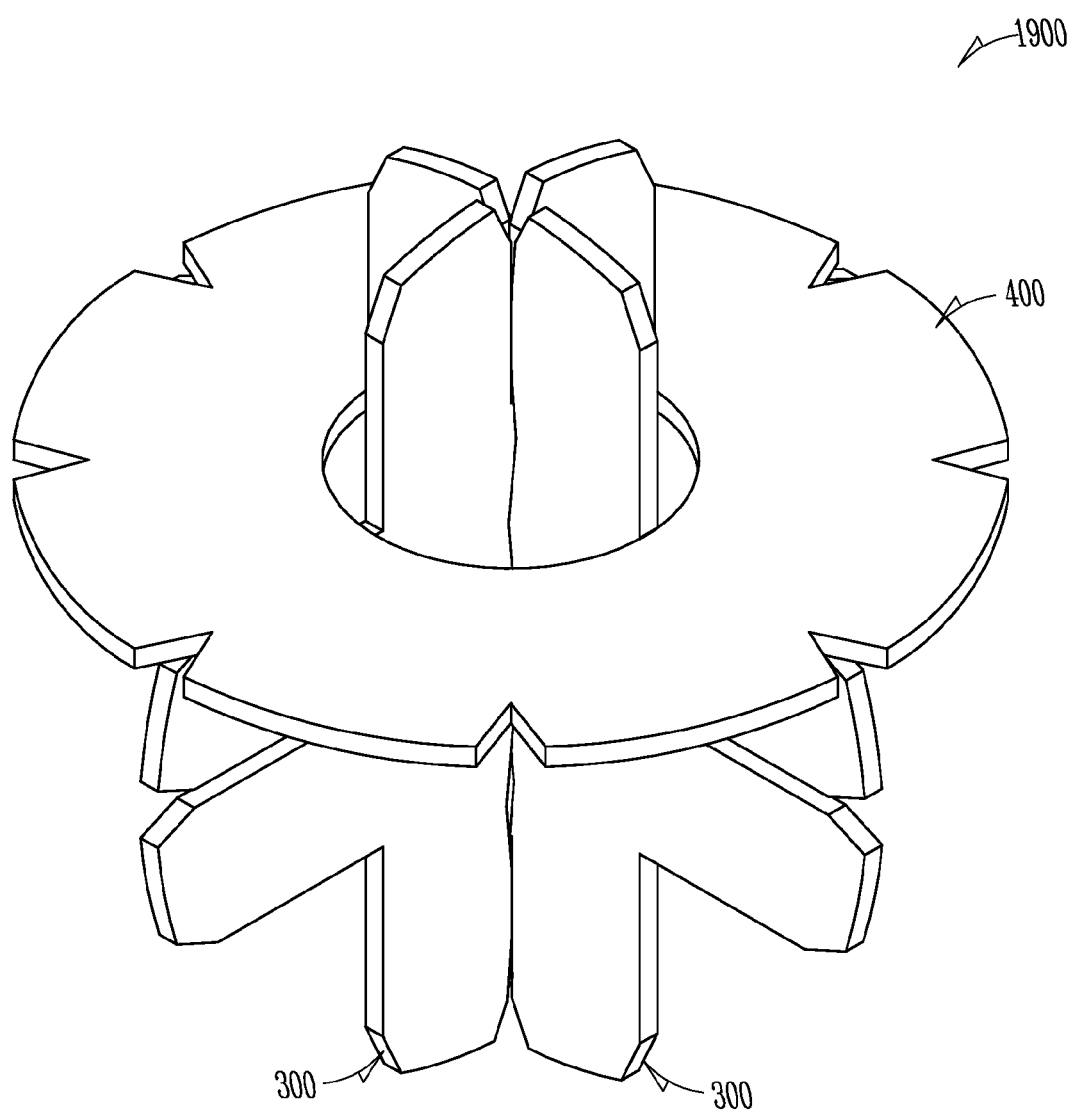
FIG. 19 is a perspective view of a connector of the type shown in FIG. 4 connected to the interlocked connectors of FIG. 13.
Figure 20:
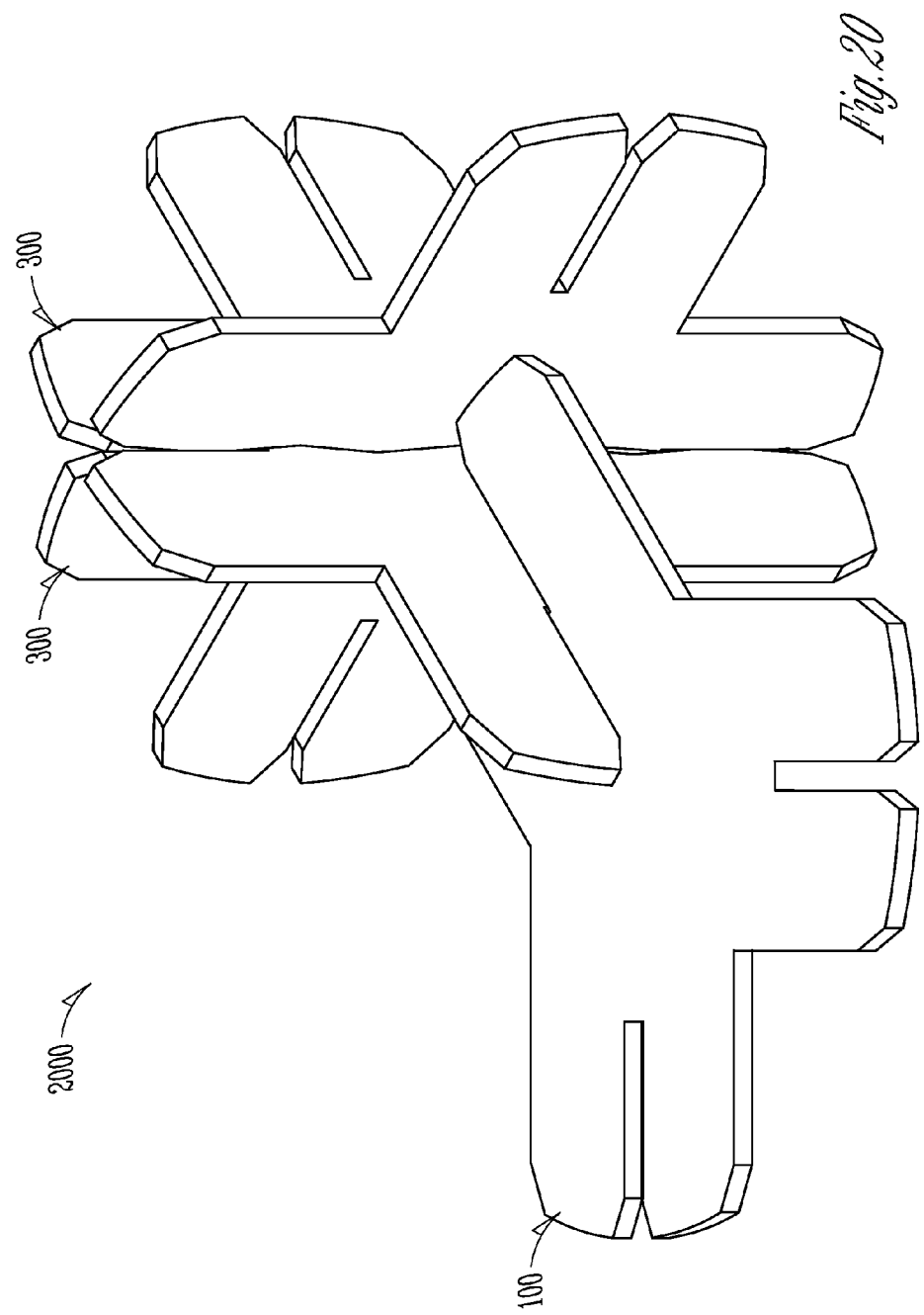
FIG. 20 is a perspective view of a connector of the type shown in FIG. 1 connected to the interlocked connectors of FIG. 13.

Besides paper cylinders or tubes, other connectors can be connected to the three-dimensional connector formed by interlocking two X-type connectors 300. For example, FIG. 19 illustrates toric connector 400 connected to interlocked X-type connectors 300 at a connection point 1900. This configuration may be useful, for example, in providing other connection points around the perimeter of the O-shaped connector 400 to which paper cylinders or other connectors can be attached. As another example, FIG. 20 illustrates a Y-type connector 100 connected to interlocked X-type connectors 300 at a connection point 2000.

Figure 21:
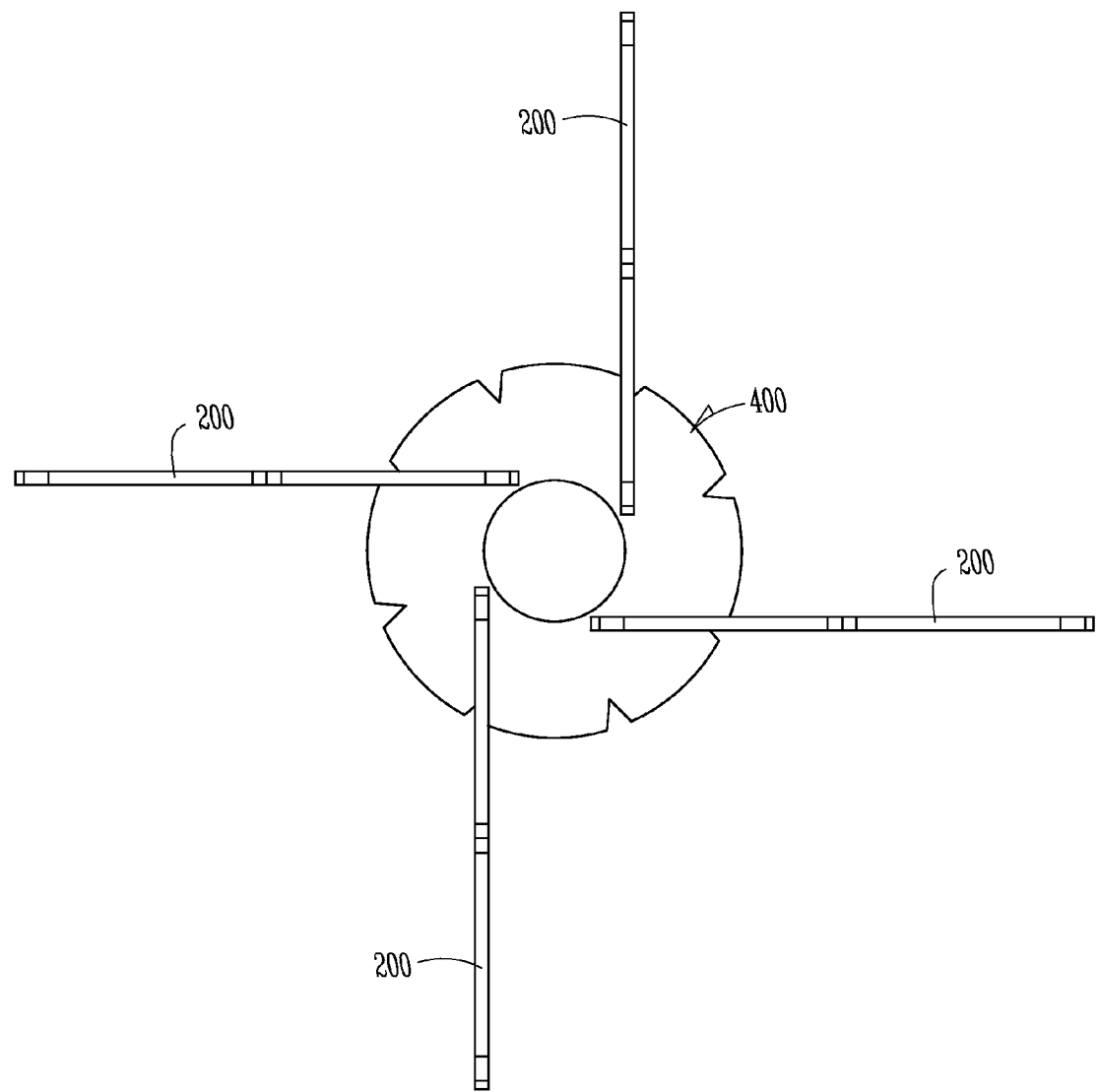
FIG. 21 is a perspective view of a number of connectors connected to the connector of the type shown in FIG. 4.

As another example of connectors cooperating with one another to form larger structures to which paper cylinders or tubes can be attached, FIG. 21 depicts a number of I-type connectors 200 connected to toric connector 400. Although I-type connectors 200 are used in the example of FIG. 20, the connectors may be any combination Y-type connectors 100, X-type connectors 300, or any other connectors in accordance with this disclosure. The slotted notches and/or triangular notches on these connectors can then form connection points to which other connectors and/or paper tubes or cylinders can be attached. In this way, structures can be constructed with a wider variety of shapes than is feasible with some conventional implementations.

Figure 22:
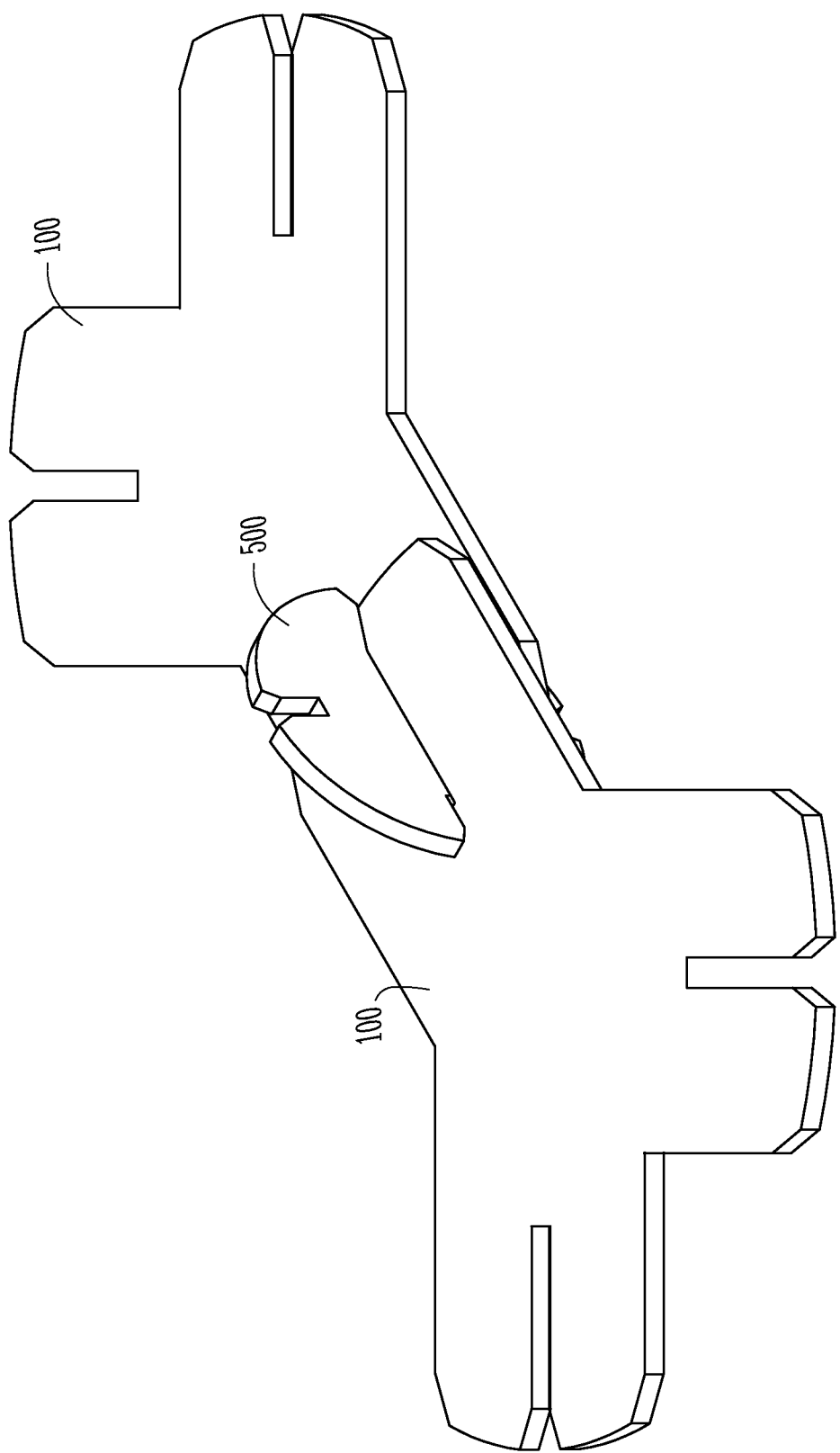
FIG. 22 is a perspective view of a number of connectors of the type shown in FIG. 1 connected by the connector of the type shown in FIG. 5.

As another example of connectors cooperating with one another to form larger structures to which paper cylinders or tubes can be attached, FIG. 22 depicts two Y-type connectors 100 connected by chip connector 500. In this arrangement, the two Y-type connectors 100 lie generally in parallel planes and chip connector 500 is generally perpendicular to connectors 100. Chip connector 500 can be employed to couple other connectors in accordance with this disclosure in a similar fashion as shown in FIG. 22. For example, chip connector 500 could connect two I-type, X-type, or toric connectors in accordance with this disclosure such that the connectors lie generally in parallel planes and chip connector 500 is generally perpendicular to the coupled connectors. Additionally, chip connector 500 could connect different combinations of different connectors, e.g., I-type to X-type or X-type to Y-type.

Figure 23:
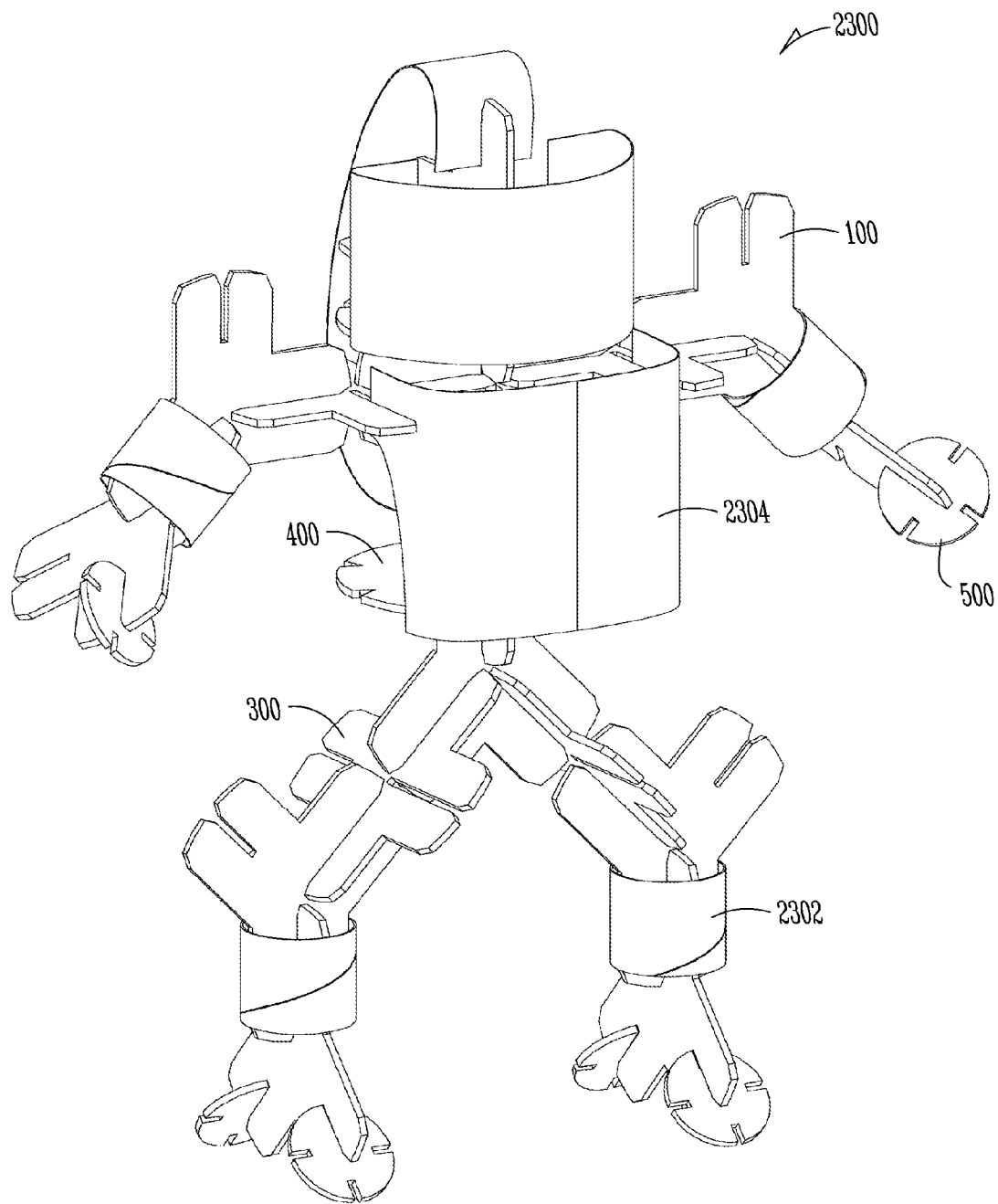
FIG. 23 depicts one example of an amusement device that can be constructed using connectors in accordance with this disclosure.

FIG. 23 depicts one example of a larger and more complex structure that can be constructed using connectors in accordance with this disclosure. FIG. 23 illustrates an example toy robot 2300, which has been constructed from a combination of Y-type connectors 100, X-type connectors 300, toric connectors 400, chips 500, and paper tubes 2302 and sheets 2304.

FIGS. 24A-24C are plan views depicting another example set of connectors in accordance with this disclosure including X-type connector 2400, Y-type connector 2402, and I-type connector 2404. Connectors 2400, 2402, and 2404 include interlocking slotted notches 2410 and 2412 in accordance with this disclosure. Slotted notches 2410 and 2412 are similar to slotted notches 1002 and 1004 from connector 1000 of FIG. 10. Additionally, the set of connectors 2400, 2402, and 2404 of FIGS. 24A-24C could also be employed in conjunction with tonic connectors and chip connectors as described above with reference to various examples.

Slotted notch 2410 is shorter than slotted notch 2412. In one example, shorter slotted notch 2410 can be approximately 1.10 inches long and longer slotted notch 2412 can be approximately 2.25 inches long. The longer slotted notch 2412 can facilitate connecting two X-type connectors 2400 in an interlocking fashion.

Slotted notches 2410 and 2412 include a generally triangular portion 2414 and a linear portion 2416. Linear portion 2416 is sized such that the width varies along the length from triangular portion 2414 to the proximal end of slotted notches 2410 and 2412. The variations in linear portion 2416 of slotted notches 2410 and 2412 are defined by a number of protrusions extending into linear portion 2416. The variations in linear portion 2416 of shorter notch 2410 are defined by distal ridge 2418, intermediate ridges 2420, and ramp 2422. The variations in linear portion 2416 of longer notch 2412 are defined by two intermediate ridges 2420 and ramp 2422.

Linear portion 2416 includes a first width, W1, between distal ridge 2418 and the side of linear portion 2416 opposite distal ridge 2418. Linear portion 2416 includes a second width, W2, between intermediate ridge(s) 2420 and the side of linear portion 2416 opposite intermediate ridge(s) 2420. Linear portion 2416 includes a third width, W3, at the proximal end of slotted notches 2410 and 2412. Linear portion 2416 includes a fourth width, W4, between two ridges protruding from opposite sides of linear portion 2416. The overall width, W, of linear portion 2416 is between opposite sides of the slot without any protrusion, e.g. ridge or ramp, that effectively reduces the width of the slot.

As noted above, linear portion 2416 of slotted notch 2410 includes one intermediate ridge 2420 and linear portion 2416 of slotted notch 2412 includes two intermediate ridges

2420. Linear portion 2416 of slotted notch 2410 includes distal ridge 2418, while linear portion 2416 of slotted notch 2412 does not include a distal ridge. In other examples, however, slotted notches of connectors in accordance with this disclosure could include different ridge and ramp configurations, e.g., more than two intermediate ridges, depending on the length of the linear portion of the slotted notch.

Slotted notches 2410 and 2412 may function to interlock different connectors in accordance with this disclosure. In one example, the first, second, and third widths, W1, W2, and W3, respectively, are substantially equal, and the overall width, W, is greater than the first, second, and third widths. Additionally, the fourth width, W4, is less than the first, second, third, and overall widths of linear portion 2416 of slotted notches 2410 and 2412. Slotted notches 2410 and 2412 may be configured to couple X-type connector 2400 to a second connector, e.g. another X-type, Y-type, I-type, toric, chip, or other connector in accordance with this disclosure by allowing the second connector to be loosely inserted into slotted notches 2410 and 2412 until the second connector is pushed to the proximal end of the slotted notch.

For example, the first, second, third, and overall widths, W1, W2, W3 and W, respectively, of linear portion 2416 can be greater than the thickness of connectors 2400, 2402, and 2404. Additionally, the fourth width, W4, of linear portion 2416 between two opposing protrusions, e.g., between distal ridge 2418 and intermediate ridge 2420 or between intermediate ridge 2420 and ramp 2422, can be less than the thickness of connectors 2400, 2402, and 2404. In this case, a second connector can be inserted into slotted notches 2410 and 2412 such that the second connector is uncoupled to one of connectors 2400, 2402, and 2404 until it is pushed to the proximal end of the slotted notch. When the second connector is pushed to the proximal end, ramp 2422 pushes the second connector against intermediate ridge 2420, which, in turn, pushes the second connector back against distal ridge 2418 or, in the case of longer slotted notch 2412, back against the more distally disposed intermediate ridge 2420. In this manner, when the second connector is pushed into the fourth width, W4, of the proximal end of linear portion 2416, the second connector becomes locked to the first connector as the second connector is press-fit into the proximal end of the slot and compressed between distal ridge 2418 and intermediate ridge 2420, in the case of shorter slotted notch 2410, or compressed between multiple intermediate ridges 2420, in the case of the longer slotted notch 2412.

The interlocking mechanism between connectors in accordance with this disclosure generally includes a slot with a variable width. In some examples, the variation of the width of the slot can be generally characterized as a series of three successively opposing protrusions that define two reduced slot widths, including the distance between one protrusion and the other side of the slot and the distance between two protrusions. The distance between one protrusion and the other side of the slot can be greater than or approximately equal to the thickness of the connector. The distance between two protrusions is less than the thickness of the connector. One example series of three successively opposing protrusions that define two reduced slot widths is distal ridge 2418, intermediate ridge 2420, and ramp 2422 of slotted notch 2410. Another example series of three successively opposing protrusions that define two reduced slot widths is the two opposing intermediate ridges 2420 and ramp 2422 of slotted notch 2412.

In one example in which connectors 2400, 2402, and 2404 each have a thickness in a range from approximately 0.125 to approximately 0.135 inches, the first, second, and third widths, W1, W2, and W3, respectively, are approximately equal to 0.160 inches. In one example, the fourth width, W4, is approximately equal to 0.115 inches and the overall width, W, of slotted notches 2410 and 2412 are approximately equal to 0.20 inches. In the example of FIGS. 24A-24C, triangular portion 2414 of notches 2410 and 2412 may be larger than, e.g., the triangular portion of slotted notches described above with reference to the examples of FIGS. 1-3, 6, and 8-10. The other dimensions of connectors 2400, 2402, and 2404 may be, in some examples, the same as the dimensions described above with reference to the examples of FIGS. 1-3, 6, and 8-10.

I-type connector 2404 includes a semi-circular notch 2424. Semi-circular notch 2424 can function as a guide for connecting I-type connector 2404 to other connectors in accordance with this disclosure. In one example, semi-circular notch 2424 can guide another connector in accordance with this disclosure to be connected to I-type connector 2404 at a variety of angles relative to I-type connector 2404. For example, I-type connector 2404 can be received in a slotted notch of a second connector at semi-circular notch 2424. After I-type connector 2404 is pushed into the slotted notch of the second connector such that the proximal end of the notch is adjacent a portion of the edge of semi-circular notch 2424, the two connectors are connected to one another and the second connector can be rotated relative to I-type connector 2404 to a desired angle. In other examples, the size of semi-circular notch 2424 could be changed, e.g., the diameter of notch 2424 could be smaller or larger.

Various examples have been described. These and other examples are within the scope of the following claims.

The invention claimed is:

1. A connector of a toy connector system, the connector comprising: a flat connector body having a uniform thickness, the connector body comprising:
   a central region; and
   two or more arms extending distally from the central region, wherein at least one of the arms comprises:
   a width configured to be press fit into a tubular element of a household product, and
   at least one slotted notch extending proximally from a distal end of the arm, wherein the at least one slotted notch comprises a slot portion comprising a first side and a second side and a plurality of protrusions extending from one of the first and second sides, the plurality of protrusions comprising:
   a distal protrusion defining a first width equal to a distance between the distal protrusion and one of the first and second sides of the slot portion;
   a proximal protrusion defining a third width equal to a distance between the proximal protrusion and one of the first and second sides of the slot portion; and
   an intermediate protrusion defining a second width equal to a distance between the intermediate protrusion and one of the first and second sides of the slot portion, wherein:
   the intermediate protrusion is arranged between the distal and proximal protrusions;
   the third width is less than the thickness of the connector body;
   the first and the second widths are greater than the thickness of the connector body;
   the distal and proximal protrusions extend from one of the first and second sides of the slot portion; and the intermediate protrusion extends from the other of the first and second sides of the slot portion.

2. The connector of claim 1, wherein the connector body comprises three arms extending distally from the central region to form a "Y" shape.

3. The connector of claim 2, wherein the at least one slotted notch comprises a plurality of slotted notches, and wherein each of the three arms comprises one of the plurality of slotted notches extending proximally from a distal end of the arm.

4. The connector of claim 1, wherein the connector body comprises four arms extending distally from the central region to form an "X" shape.

5. The connector of claim 4, wherein the at least one slotted notch comprises a plurality of slotted notches, and wherein each of the four arms comprises one of the plurality of slotted notches extending proximally from a distal end of the arm.

6. The connector of claim 5, wherein one of the slotted notches extends proximally a greater distance than the other slotted notches.

7. The connector of claim 1, wherein the connector body comprises two arms extending distally from the central region to form an "I" shape.

8. The connector of claim 7, wherein the at least one slotted notch comprises two slotted notches, and wherein each of the two arms comprises one of the two slotted notches extending proximally from a distal end of the arm.

9. The connector of claim 1, wherein the connector body comprises at least one of fiberboard, plastic, or wood.

10. The connector of claim 1, wherein the connector body comprises a plurality of layers of fiberboard.

11. The connector of claim 1, wherein the connector body comprises:
   first, second, and third fiberboard layers, wherein the second fiberboard layer is arranged between the first and the third fiberboard layers;
   a first paper layer substantially covering a major surface of the first fiberboard layer; and
   a second paper layer substantially covering a major surface of the third fiberboard layer.

12. The connector of claim 1, wherein the connector body comprises an aqueous coating.

13. The connector of claim 1, wherein the at least one slotted notch comprises a notch portion, and wherein the slot portion extends from an end of the notch portion.

14. The connector of claim 1, wherein the notch portion is triangular.

15. The connector of claim 1, wherein the slot portion is at least one of substantially linear or curved.

16. The connector of claim 1, wherein the first and the second widths are approximately equal to one another.

* * * * *

UNITED STATES PATENT AND TRADEMARK OFFICE
CERTIFICATE OF CORRECTION

PATENT NO. : 9,458,872 B2
APPLICATION NO. : 14/213123
DATED : October 4, 2016
INVENTOR(S) : Jeffrey Freeland Nelson It is certified that error appears in the above-identified patent and that said Letters Patent is hereby corrected as shown below:

On the Title Page

In item (73), in "Assignee", in Column 1, Line 1, delete "Scratch" and insert -- Scratch, --, therefor Signed and Sealed this
Twenty-seventh Day of March, 2018

Andrei Iancu
*Director of the United States Patent and Trademark Office*